(12) United States Patent
Krishnamurthy et al.

(10) Patent No.: US 12,517,263 B2
(45) Date of Patent: Jan. 6, 2026

(54) COMMON TIMING OFFSET SIGNALING IN A NON- TERRESTRIAL NETWORK

(71) Applicant: QUALCOMM Incorporated, San Diego, CA (US)

(72) Inventors: Harikumar Krishnamurthy, San Diego, CA (US); Xiao Feng Wang, San Diego, CA (US); Liangping Ma, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 548 days.

(21) Appl. No.: 17/654,179

(22) Filed: Mar. 9, 2022

(65) Prior Publication Data

US 2023/0135149 A1     May 4, 2023

Related U.S. Application Data

(60) Provisional application No. 63/263,505, filed on Nov. 3, 2021.

(51) Int. Cl.
*H04W 84/06* (2009.01)
*G01S 19/25* (2010.01)
*H04W 56/00* (2009.01)

(52) U.S. Cl.
CPC .......... *G01S 19/258* (2013.01); *G01S 19/256* (2013.01); *H04W 56/001* (2013.01); *H04W 84/06* (2013.01)

(58) Field of Classification Search
CPC .. G01S 19/258; G01S 19/256; H04W 56/001; H04W 84/06

(Continued)

(56) References Cited

U.S. PATENT DOCUMENTS

2016/0173188 A1  6/2016 Uchino et al.
2020/0205108 A1  6/2020 Alasti et al.
(Continued)

FOREIGN PATENT DOCUMENTS

WO  WO-2020031155 A1 *  2/2020  .......... H04B 7/2125
WO     2020164362 A1     8/2020
(Continued)

OTHER PUBLICATIONS

Ericsson: "On UL Time and Frequency Synchronization Enhancements for NTN", 3GPP TSG-RAN WG1 Meeting #106bis-e, R1-2109928, 3rd Generation Partnership Project, Mobile Competence Centre, 650, Route Des Lucioles, F-06921 Sophia-Antipolis Cedex, France, vol. RAN WG1, no. e-Meeting, Oct. 11, 2021-Oct. 19, 2021, Oct. 1, 2021, XP052058846, 31 Pages, The Whole Document.

(Continued)

*Primary Examiner* — Ahmad F. Matar
*Assistant Examiner* — Jirapon Tulop
(74) *Attorney, Agent, or Firm* — Harrity & Harrity, LLP

(57) ABSTRACT

Various aspects of the present disclosure generally relate to wireless communication. In some aspects, a network node may transmit, and a user equipment (UE) may receive, signaling indicating one or more common timing offset parameters that are based at least in part on one or more delays between a satellite and a reference point in a non-terrestrial network (NTN). The UE may determine a transmit time for an uplink signal based at least in part on the one or more common timing offset parameters and a starting time associated with an uplink slot in which the uplink signal is to arrive at the reference point. The UE may transmit the uplink signal at the transmit time. Numerous other aspects are described.

29 Claims, 13 Drawing Sheets

(58) Field of Classification Search
USPC .................................................... 455/456.1
See application file for complete search history.

(56) References Cited

U.S. PATENT DOCUMENTS

| | | | |
|---|---|---|---|
| 2021/0314894 A1 | 10/2021 | Lauridsen et al. | |
| 2022/0287048 A1* | 9/2022 | Lin | H04L 27/2655 |
| 2022/0408389 A1* | 12/2022 | Wang | H04W 56/0045 |

FOREIGN PATENT DOCUMENTS

| | | | |
|---|---|---|---|
| WO | 2021089054 A1 | 5/2021 | |
| WO | 2021164579 A1 | 8/2021 | |

OTHER PUBLICATIONS

Huawei, et al., "Discussion on UL Time and Frequency Synchronization Enhancement for NTN", 3GPP TSG RAN WG1 Meeting #106-e, R1-2106483, 3rd Generation Partnership Project, Mobile Competence Centre, 650, Route Des Lucioles, F-06921 Sophia-Antipolis Cedex, France vol. RAN WG1, no. E-meeting, Aug. 16, 2021-Aug. 27, 2021, Aug. 7, 2021, XP052037811, 11 Pages, The Whole Document.
International Search Report and Written Opinion—PCT/US2022/076873—ISA/EPO—Dec. 21, 2022.

* cited by examiner

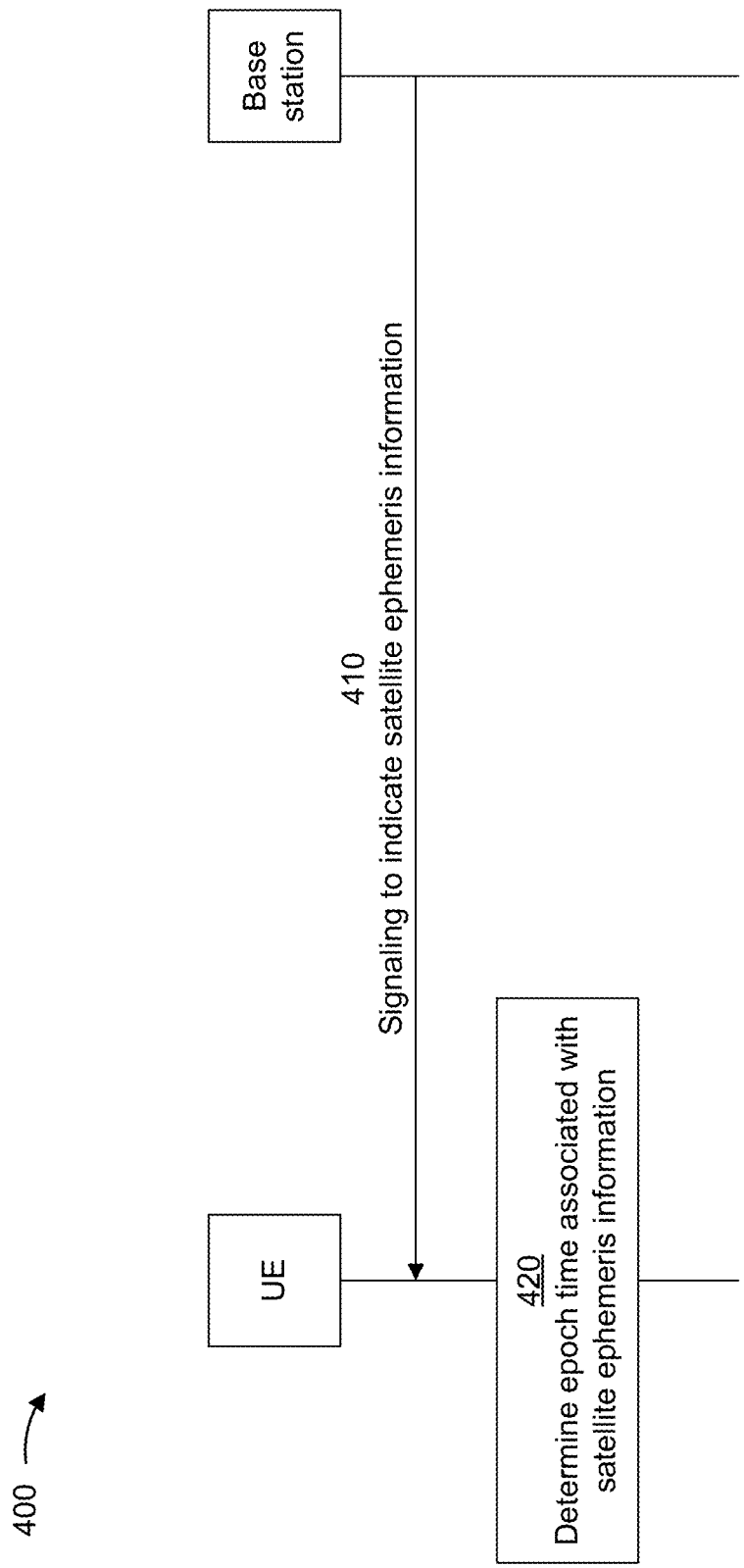

COMMON TIMING OFFSET SIGNALING IN A NON- TERRESTRIAL NETWORK

CROSS-REFERENCE TO RELATED APPLICATION

This Patent Application claims priority to U.S. Provisional Patent Application No. 63/263,505, filed on Nov. 3, 2021, entitled "COMMON TIMING OFFSET SIGNALING IN A NON-TERRESTRIAL NETWORK," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for common timing offset signaling in a non-terrestrial network (NTN).

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a user equipment (UE) for wireless communication. The UE may include: a transceiver; a memory comprising instructions; and one or more processors. The one or more processors may be configured to execute the instructions and cause the UE to receive, via the transceiver from a network node, signaling indicating one or more common timing offset parameters that are based at least in part on one or more delays between a satellite and a reference point in a non-terrestrial network (NTN). The one or more processors may be configured to execute the instructions and cause the UE to determine a transmit time for an uplink signal based at least in part on the one or more common timing offset parameters and a starting time associated with an uplink slot in which the uplink signal is to arrive at the reference point. The one or more processors may be configured to execute the instructions and cause the UE to transmit, via the transceiver, the uplink signal at the transmit time.

Some aspects described herein relate to a network node for wireless communication. The network node may include: a transceiver; a memory comprising instructions; and one or more processors. The one or more processors may be configured to execute the instructions and cause the network node to determine one or more delays between a satellite and a reference point in an NTN. The one or more processors may be configured to execute the instructions and cause the network node to transmit, to a UE via the transceiver, signaling indicating one or more common timing offset parameters that are based at least in part on the one or more delays between the satellite and the reference point.

Some aspects described herein relate to a method for wireless communication at a UE. The method may include receiving, from a network node, signaling indicating one or more common timing offset parameters that are based at least in part on one or more delays between a satellite and a reference point in an NTN. The method may include determining a transmit time for an uplink signal based at least in part on the one or more common timing offset parameters and a starting time associated with an uplink slot in which the uplink signal is to arrive at the reference point. The method may include transmitting the uplink signal at the transmit time.

Some aspects described herein relate to a method for wireless communication at a network node. The method may include determining one or more delays between a satellite and a reference point in an NTN. The method may include transmitting, to a UE, signaling indicating one or more common timing offset parameters that are based at least in part on the one or more delays between the satellite and the reference point.

Some aspects described herein relate to a non-transitory computer-readable medium that stores a set of instructions for wireless communication by a UE. The set of instructions, when executed by one or more processors of the UE, may cause the UE to receive, from a network node, signaling indicating one or more common timing offset parameters that are based at least in part on one or more delays between a satellite and a reference point in an NTN. The set of instructions, when executed by one or more processors of the UE, may cause the UE to determine a transmit time for an uplink signal based at least in part on the one or more common timing offset parameters and a starting time associated with an uplink slot in which the uplink signal is to arrive at the reference point. The set of instructions, when executed by one or more processors of the UE, may cause the UE to transmit the uplink signal at the transmit time.

Some aspects described herein relate to a non-transitory computer-readable medium that stores a set of instructions for wireless communication by a network node. The set of instructions, when executed by one or more processors of the network node, may cause the network node to determine one or more delays between a satellite and a reference point in an NTN. The set of instructions, when executed by one or more processors of the network node, may cause the network node to transmit, to a UE, signaling indicating one or more common timing offset parameters that are based at least in part on the one or more delays between the satellite and the reference point.

Some aspects described herein relate to an apparatus for wireless communication. The apparatus may include means for receiving, from a network node, signaling indicating one or more common timing offset parameters that are based at least in part on one or more delays between a satellite and a reference point in an NTN. The apparatus may include means for determining a transmit time for an uplink signal based at least in part on the one or more common timing offset parameters and a starting time associated with an uplink slot in which the uplink signal is to arrive at the reference point. The apparatus may include means for transmitting the uplink signal at the transmit time.

Some aspects described herein relate to an apparatus for wireless communication. The apparatus may include means for determining one or more delays between a satellite and a reference point in an NTN. The apparatus may include means for transmitting, to a UE, signaling indicating one or more common timing offset parameters that are based at least in part on the one or more delays between the satellite and the reference point.

Some aspects described herein relate to an apparatus for wireless communication. The apparatus may include: a memory comprising instructions; and one or more processors. The one or more processors may be configured to execute the instructions and cause the apparatus to obtain, from a network node, signaling indicating one or more common timing offset parameters that are based at least in part on one or more delays between a satellite and a reference point in an NTN. The one or more processors may be configured to execute the instructions and cause the apparatus to determine a transmit time for an uplink signal based at least in part on the one or more common timing offset parameters and a starting time associated with an uplink slot in which the uplink signal is to arrive at the reference point. The one or more processors may be configured to execute the instructions and cause the apparatus to output the uplink signal for transmission at the transmit time.

Some aspects described herein relate to an apparatus for wireless communication. The apparatus may include: a memory comprising instructions; and one or more processors. The one or more processors may be configured to execute the instructions and cause the apparatus to determine one or more delays between a satellite and a reference point in an NTN. The one or more processors may be configured to execute the instructions and cause the apparatus to output, for transmission to a UE, signaling indicating one or more common timing offset parameters that are based at least in part on the one or more delays between the satellite and the reference point.

Some aspects described herein relate to a method for wireless communication at a UE. The method may include obtaining, from a network node, signaling indicating one or more common timing offset parameters that are based at least in part on one or more delays between a satellite and a reference point in an NTN. The method may include determining a transmit time for an uplink signal based at least in part on the one or more common timing offset parameters and a starting time associated with an uplink slot in which the uplink signal is to arrive at the reference point. The method may include outputting the uplink signal for transmission at the transmit time.

Some aspects described herein relate to a method for wireless communication at a network node. The method may include determining one or more delays between a satellite and a reference point in an NTN. The method may include outputting, for transmission to a UE, signaling indicating one or more common timing offset parameters that are based at least in part on the one or more delays between the satellite and the reference point.

Some aspects described herein relate to a non-transitory computer-readable medium that stores a set of instructions for wireless communication by an apparatus. The set of instructions, when executed by one or more processors of the apparatus, may cause the apparatus to obtain, from a network node, signaling indicating one or more common timing offset parameters that are based at least in part on one or more delays between a satellite and a reference point in an NTN. The set of instructions, when executed by one or more processors of the apparatus, may cause the apparatus to determine a transmit time for an uplink signal based at least in part on the one or more common timing offset parameters and a starting time associated with an uplink slot in which the uplink signal is to arrive at the reference point. The set of instructions, when executed by one or more processors of the apparatus, may cause the apparatus to output the uplink signal for transmission at the transmit time.

Some aspects described herein relate to a non-transitory computer-readable medium that stores a set of instructions for wireless communication by an apparatus. The set of instructions, when executed by one or more processors of the apparatus, may cause the apparatus to determine one or more delays between a satellite and a reference point in an NTN. The set of instructions, when executed by one or more processors of the apparatus, may cause the apparatus to output, for transmission to a UE, signaling indicating one or more common timing offset parameters that are based at least in part on the one or more delays between the satellite and the reference point.

Some aspects described herein relate to an apparatus for wireless communication. The apparatus may include means for obtaining, from a network node, signaling indicating one or more common timing offset parameters that are based at least in part on one or more delays between a satellite and a reference point in an NTN. The apparatus may include means for determining a transmit time for an uplink signal based at least in part on the one or more common timing offset parameters and a starting time associated with an uplink slot in which the uplink signal is to arrive at the reference point. The apparatus may include means for outputting the uplink signal for transmission at the transmit time.

Some aspects described herein relate to an apparatus for wireless communication. The apparatus may include means for determining one or more delays between a satellite and a reference point in an NTN. The apparatus may include means for outputting, for transmission to a UE, signaling indicating one or more common timing offset parameters that are based at least in part on the one or more delays between the satellite and the reference point.

Aspects generally include a method, apparatus, system, computer program product, non-transitory computer-readable medium, user equipment, base station, satellite, reference point, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 4 is a diagram illustrating an example associated with signaling ephemeris information in an NTN, in accordance with the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
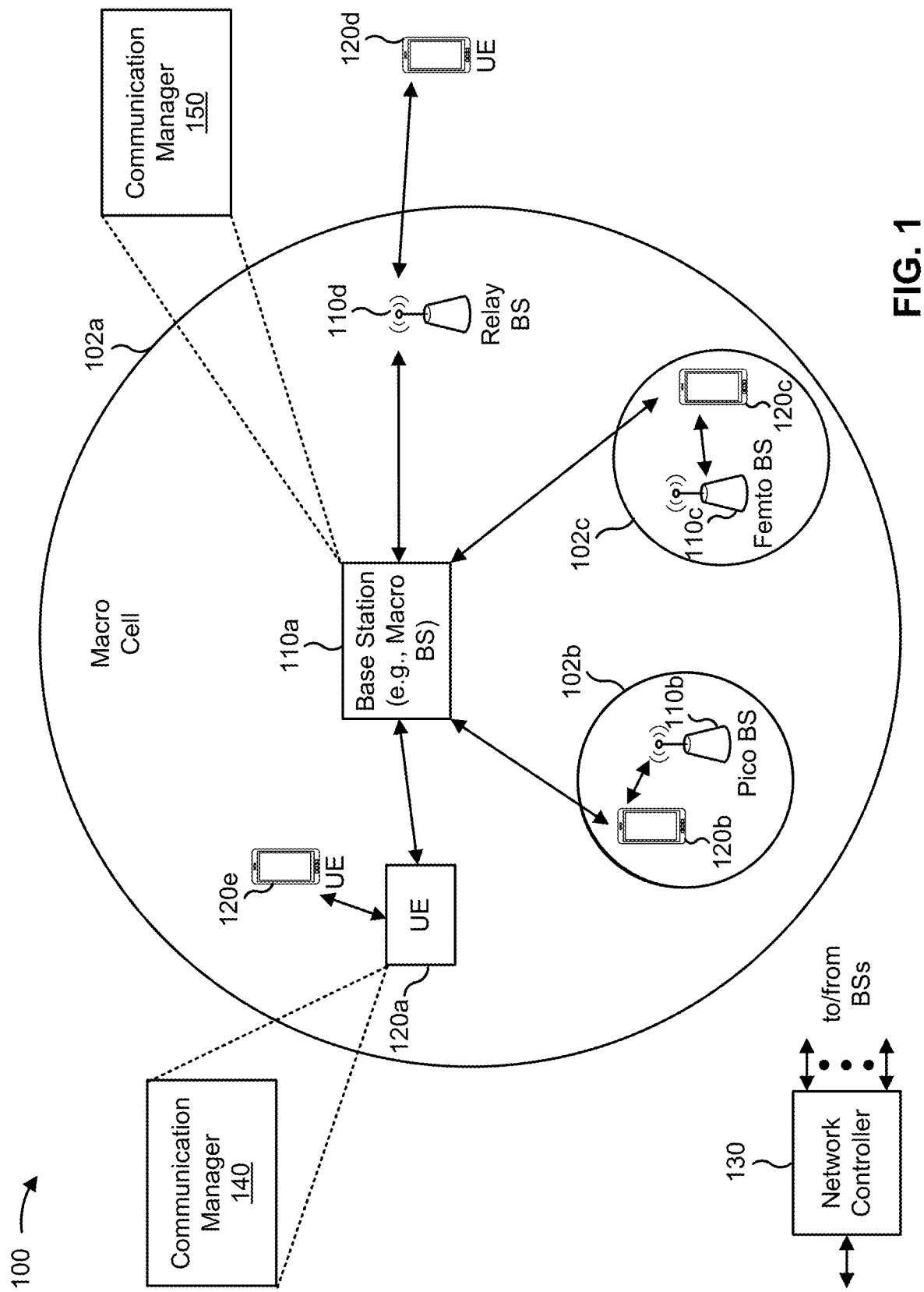
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicleto-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the wireless network 100 may include one or more non-terrestrial network (NTN) deployments in which a non-terrestrial wireless communication device may include a base station (referred to herein, interchangeably, as a "non-terrestrial base station") and/or a relay station (referred to herein, interchangeably, as a "non-terrestrial relay station"). As used herein, "NTN" may refer to a network for which access is facilitated by a non-terrestrial base station and/or a non-terrestrial relay station. The wireless network 100 may include any number of non-terrestrial wireless communication devices. A non-terrestrial wireless communication device may include a satellite and/or a high-altitude platform (HAP). A HAP may include a balloon, a dirigible, an airplane, and/or an unmanned aerial vehicle. A non-terrestrial wireless communication device may be part of an NTN that is separate from the wireless network 100. Alternatively, an NTN may be part of the wireless network 100. Satellites may communicate directly and/or indirectly with other entities in wireless network 100 using satellite communication. The other entities may include UEs, other satellites in the one or more NTN deployments, other types of base stations (e.g., stationary or ground-based base stations), relay stations, and/or one or more components and/or devices included in a core network of wireless network 100.

Deployment of communication systems, such as 5G NR systems, may be arranged in multiple manners with various components or constituent parts. In a 5G NR system, or network, a network node, a network entity, a mobility element of a network, a RAN node, a core network node, a network element, or a network equipment, such as a base station (BS, e.g., base station 110), or one or more units (or one or more components) performing base station functionality, may be implemented in an aggregated or disaggregated architecture. For example, a BS (such as a Node B (NB), eNB, NR BS, 5G NB, access point (AP), a TRP, a cell, or the like) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also can be implemented as virtual units, i.e., a virtual centralized unit (VCU), a virtual distributed unit (VDU), or a virtual radio unit (VRU).

Base station-type operation or network design may consider aggregation characteristics of base station functionality. For example, disaggregated base stations may be utilized in an integrated access backhaul (IAB) network, an O-RAN (such as the network configuration sponsored by the O-RAN Alliance), or a virtualized radio access network (vRAN), also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

Accordingly, as described herein, the term "base station" (e.g., the base station 110) or "network node" may refer to an aggregated base station, a disaggregated base station, an IAB node, a relay node, and/or one or more components thereof. For example, in some aspects, the term "base station" or "network node" may refer to a CU, a DU, an RU, a Near-Real Time (Near-RT) RAN Intelligent Controller (MC), or a Non-Real Time (Non-RT) MC, or a combination thereof. In some aspects, the term "base station" or "network node" may refer to one device configured to perform one or more functions, such as those described herein in connection with the base station 110. In some aspects, the term "base station" or "network node" may refer to multiple devices configured to perform the one or more functions. For example, in some distributed systems, each of a number of different devices (which may be located in the same geographic location or in different geographic locations) may be configured to perform at least a portion of a function, or to duplicate performance of at least a portion of the function, and the term "base station" or "network node" may refer to any one or more of those different devices. In some aspects, the term "base station" or "network node" may refer to one or more virtual base stations and/or one or more virtual base station functions. For example, in some aspects, two or more base station functions may be instantiated on a single device. In some aspects, the term "base station" or "network node" may refer to one of the base station functions and not another. In this way, a single device may include more than one base station.

In some aspects, the UE 120 may include a communication manager 140. As described in more detail elsewhere herein, the communication manager 140 may obtain, from a network node (e.g., base station 110), signaling indicating one or more common timing offset parameters that are based at least in part on one or more delays between a satellite and a reference point in an NTN; determine a transmit time for an uplink signal based at least in part on the one or more common timing offset parameters and a starting time associated with an uplink slot in which the uplink signal is to arrive at the reference point; and output the uplink signal for transmission at the transmit time. Additionally, or alternatively, the communication manager 140 may perform one or more other operations described herein.

In some aspects, the base station 110 may include a communication manager 150. As described in more detail elsewhere herein, the communication manager 150 may determine one or more delays between a satellite and a reference point in an NTN; and output, for transmission to a UE 120, signaling indicating one or more common timing offset parameters that are based at least in part on the one or more delays between the satellite and the reference point. Additionally, or alternatively, the communication manager 150 may perform one or more other operations described herein.

As indicated above, FIG. 1 is provided as an example. Other examples may differ from what is described with regard to FIG. 1.

Figure 2:
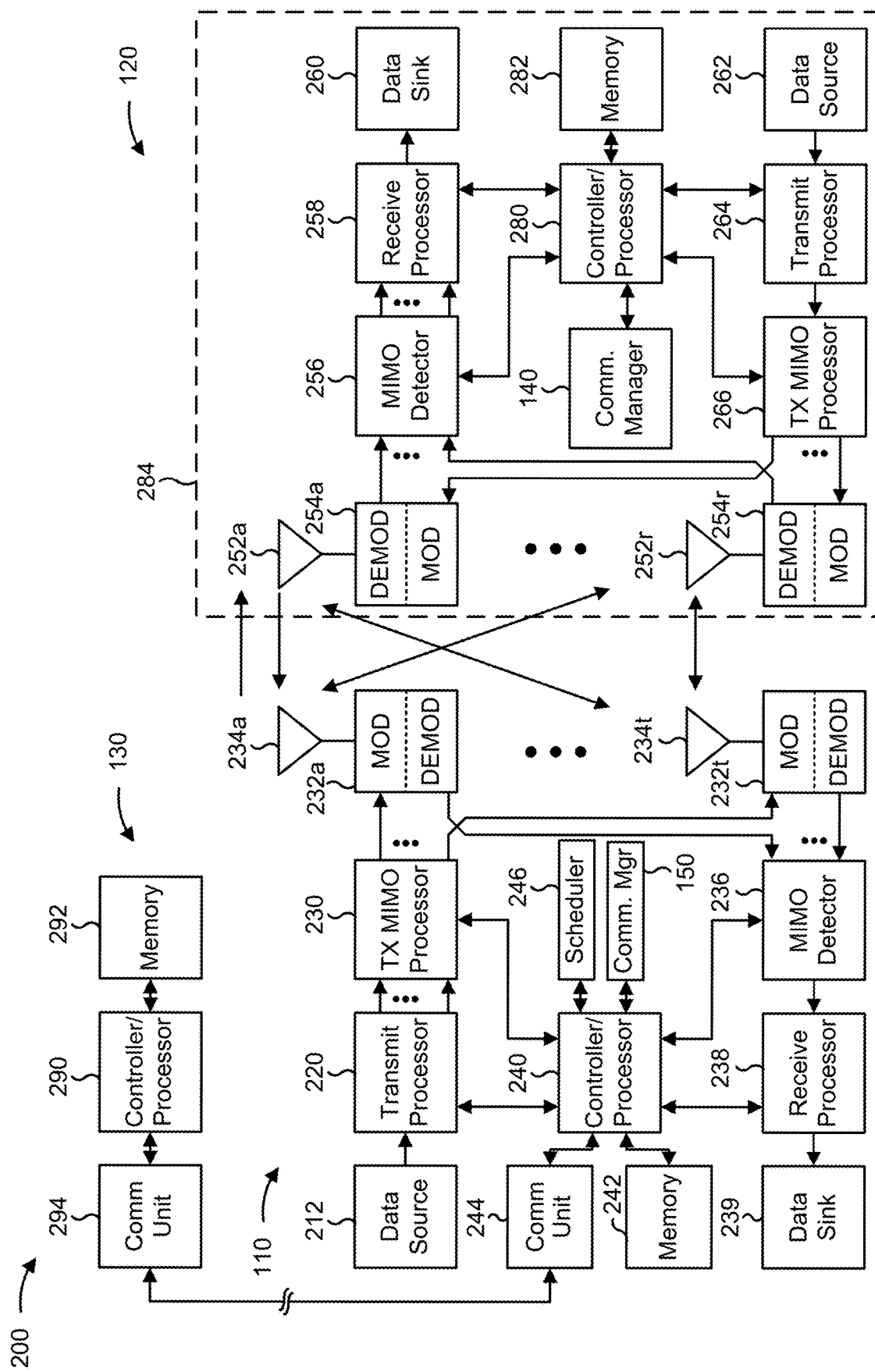
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 4-10).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 4-10).

The controller/processor 240 of the base station 110, the controller/processor 280 of the UE 120, and/or any other component(s) of FIG. 2 may perform one or more techniques associated with common timing offset signaling in an NTN, as described in more detail elsewhere herein. For example, the controller/processor 240 of the base station 110, the controller/processor 280 of the UE 120, and/or any other component(s) of FIG. 2 may perform or direct operations of, for example, process 700 of FIG. 7, process 800 of FIG. 8, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 700 of FIG. 7, process 800 of FIG. 8, and/or other processes as described herein. In some examples, executing instructions may include running the instructions, converting the instructions, compiling the instructions, and/or interpreting the instructions, among other examples.

In some aspects, the UE 120 includes means for obtaining, from a network node (e.g., the base station 110), signaling indicating one or more common timing offset parameters that are based at least in part on one or more delays between a satellite and a reference point in an NTN; means for determining a transmit time for an uplink signal based at least in part on the one or more common timing offset parameters and a starting time associated with an uplink slot in which the uplink signal is to arrive at the reference point; and/or means for outputting the uplink signal for transmission at the transmit time. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, a network node (e.g., the base station 110) includes means for determining one or more delays between a satellite and a reference point in an NTN; and/or means for outputting, for transmission to a UE 120, signaling indicating one or more common timing offset parameters that are based at least in part on the one or more delays between the satellite and the reference point. The means for the network node to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
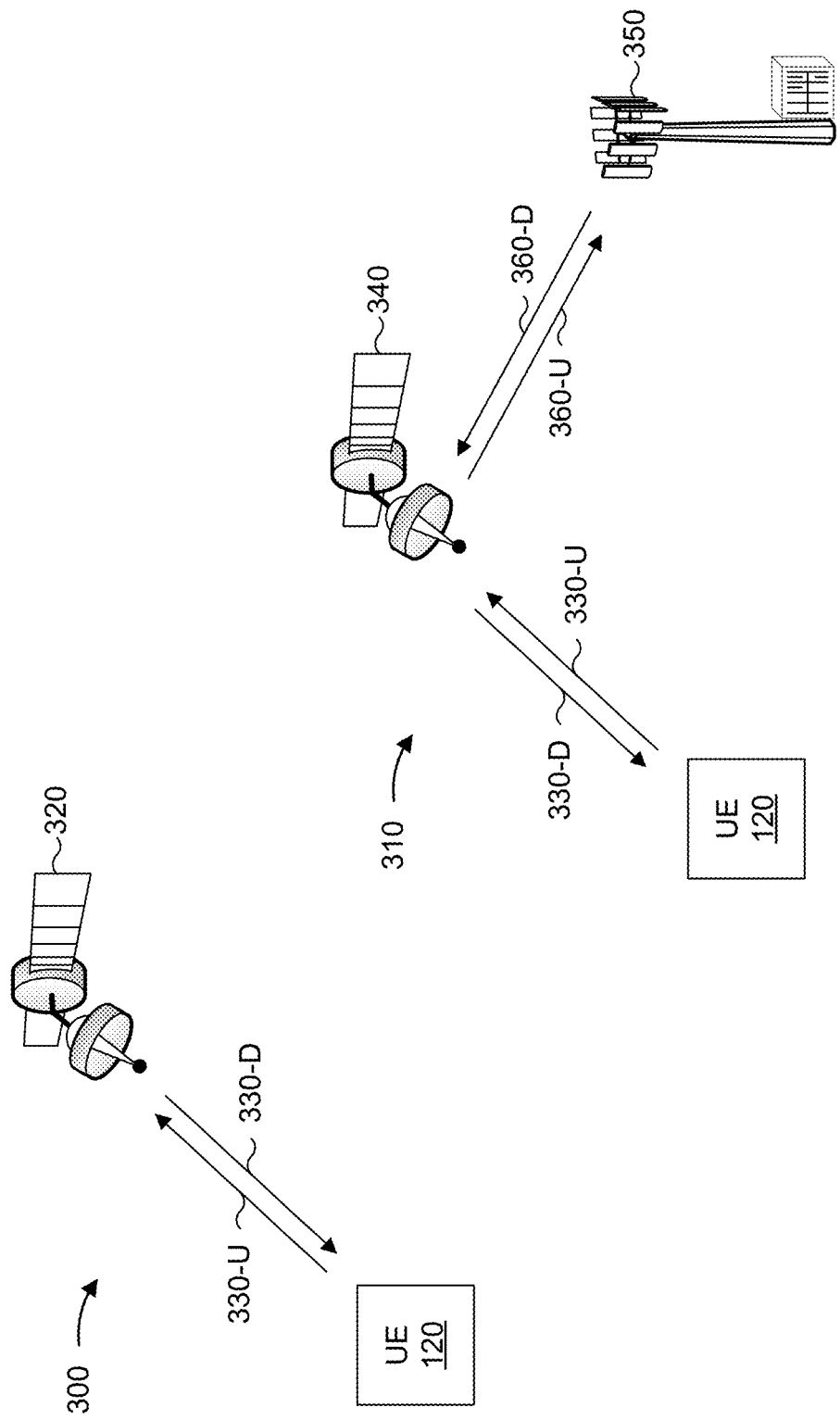
FIG. 3 is a diagram illustrating an example of a regenerative satellite deployment and an example of a transparent satellite deployment in a non-terrestrial network (NTN).

FIG. 3 is a diagram illustrating an example 300 of a regenerative satellite deployment and an example 310 of a transparent satellite deployment in an NTN.

Example 300 shows a regenerative satellite deployment in an NTN. In example 300, a UE 120 is served by a satellite 320 via a service link 330. For example, the satellite 320 may include a base station 110 (e.g., base station 110a) and/or a gNB. The satellite 320 may be referred to as a non-terrestrial base station, a regenerative repeater, and/or an on-board processing repeater, among other examples. The satellite 320 may demodulate an uplink radio frequency (RF) signal and may modulate a baseband signal derived from the uplink RF signal to produce a downlink RF transmission. The satellite 320 may transmit the downlink RF signal to the UE 120 on the service link 330. The satellite 320 may provide a cell that covers the UE 120.

Example 310 shows a transparent satellite deployment, which may also be referred to as a bent-pipe satellite deployment. In example 310, a UE 120 is served by a satellite 340 via the service link 330. The satellite 340 may be a transparent satellite. The satellite 340 may relay a signal received from a gateway 350 (e.g., a reference point) via a feeder link 360. For example, the satellite 340 may receive an RF transmission from the gateway 350 via the feeder link 360 and may relay the RF transmission to the UE 120 via the service link 330 without demodulating the RF transmission. Additionally, or alternatively, the satellite 340 may receive an RF transmission from the UE 120 via the service link 330 and may relay the RF transmission to the gateway 350 via the feeder link 360 without demodulating the RF transmission. The satellite 340 may frequency convert the RF transmission(s) received on the service link 330 to a frequency of the RF transmission(s) on the feeder link 360 (or vice versa) and may amplify and/or filter the relayed RF transmission(s). The UEs 120 shown in example 300 and example 310 may be associated with a Global Navigation Satellite System (GNSS) capability or a Global Positioning System (GPS) capability, though not all UEs have such capabilities. The satellite 340 may provide a cell that covers the UE 120.

As shown in FIG. 3, the service link 330 may include a link between the satellite 320/340 and the UE 120, and may include one or more of an uplink or a downlink. The feeder link 360 may include a link between the satellite 340 and the gateway 350, and may include one or more of an uplink (e.g., from the UE 120 to the gateway 350 via the satellite 340) or a downlink (e.g., from the gateway 350 to the UE 120 via the satellite 340). As shown in FIG. 3, an uplink of the service link 330 is indicated by reference number 330-U and a downlink of the service link 330 is indicated by reference number 330-D. Similarly, an uplink of the feeder link 360 is indicated by reference number 360-U and a downlink of the feeder link 360 is indicated by reference number 360-D.

The feeder link 360 and the service link 330 may each experience Doppler effects due to the movement of the satellites 320 and 340, and potentially movement of a UE 120. The Doppler effects may be significantly larger than in a terrestrial network. The Doppler effect on the feeder link 360 may be compensated for to some degree, but may still be associated with some amount of uncompensated frequency error. Furthermore, the gateway 350 may be associated with a residual frequency error, and/or the satellite 320/340 may be associated with an on-board frequency error. These sources of frequency error may cause a received downlink frequency at the UE 120 to drift from a target downlink frequency. Furthermore, due to the long distance between the UE 120 and satellite 320/340, communication in an NTN may be associated with a much longer delay (e.g., a longer latency and/or a longer round-trip time (RTT)) than a delay associated with a terrestrial network. The delay may be even greater in a transparent satellite deployment because any communication between the UE 120 and the gateway 350 must travel over the service link 330 and the feeder link 360, each of which may associated with a longer delay than a terrestrial network.

Accordingly, to account for the long delays in an NTN, a UE may generally apply a timing advance (TA) to an uplink transmission performed in a radio resource control (RRC) idle or inactive state and/or an uplink transmission performed in an RRC connected state. Applying the TA to the uplink transmission can include transmitting the uplink transmission at an earlier time (e.g., at a transmit time that is advanced by a value of the TA). For example, the TA applied by the UE may have a value that corresponds to a length of time that a signal takes to travel from a reference point to the UE and back to the reference point, where the reference point may be included in a satellite in a regenerative satellite deployment or included in a gateway or a base station in a transparent satellite deployment. For example, as described herein, the reference point in an NTN may generally correspond to a physical entity in the NTN where downlink and uplink slots are synchronized, and a slot duration is constant over time. The TA applied by the UE may therefore correspond to a round-trip time (RTT) between the reference point and the UE because the TA is relative to a downlink slot at the UE, which is already a single-trip delay relative to the same downlink slot at the reference point. In this way, the TA applied by the UE may align uplink reception timing at the reference point to enable communication with different UEs that may be located at various distances from the reference point. For example, the TA that a UE applies when performing an uplink transmission in an NTN, $T_{TA}$, may be given by:

$$T_{TA} = (N_{TA} + N_{TA,UE\text{-}specific} + N_{TA,common} + N_{TA,offset}) \times T_c$$

In the above expression, $N_{TA}$ is a closed-loop timing offset between uplink and downlink radio frames at the UE. For example, the closed-loop timing offset may be defined as zero (0) for a physical random access channel (PRACH) transmission that occurs before the UE has established an RRC connection, and the closed-loop timing offset value may then be updated based at least in part on a TA command field in msg2 in a four-step random access procedure, a TA command field in msgB in a two-step random access procedure, and/or a medium access control (MAC) control element (MAC-CE) TA command, among other examples. Furthermore, the parameter $N_{TA,UE\text{-}specific}$ represents an open-loop UE-specific TA that is self-estimated by the UE to precompensate for a service link delay, the parameter $N_{TA,common}$ is a network-controlled common TA (e.g., a TA that is common to all UEs in the NTN or all UEs served by a satellite) that includes any timing offsets that may be considered necessary by the NTN, the parameter $N_{TA,offset}$ is a fixed timing advance offset that the UE uses to calculate the TA applied to an uplink transmission, and $T_c$ is a timing unit defined as $1/(480,000 \times 4096)$ seconds, or 0.509 nanoseconds. In some cases, however, the network-controlled common timing offset, $N_{TA,common}$, may cause significant timing errors when the common timing offset is set to be the feeder link delay based on an incorrect assumption that the feeder link delay is the same for all UEs.

For example, in cases where the NTN is configured such that the reference point (the location where downlink and uplink slots are synchronized and a slot duration is constant over time) is at the satellite, the network-controlled common timing offset may be set to zero (0) because there is no feeder link delay to incorporate into the total TA applied by a UE. However, because configuring the reference point to be at the satellite may be associated with increased complexity, an NTN may be configured such that the reference point is at the base station or another terrestrial or non-terrestrial node in a communication path between the satellite and the base station (e.g., a physical entity or physical node that relays communications between the base station and the satellite via a backhaul, a midhaul, or a fronthaul, such as an RU or a DU of a disaggregated base station). In this case, the network-controlled common timing offset may have a non-zero value that changes over time (e.g., based on the feeder link delay that exists at a given time, which may vary over time due to movement of the satellite orbiting the Earth and/or movement of the reference point caused by rotation of the Earth changing the distance between the satellite and the reference point). In such cases, the base station may periodically signal the common timing offset value, or the base station may signal the common timing offset value and/or one or more derivatives of the common timing offset value so that the UE can calculate the common timing offset value over an extended time period.

However, when the common timing offset is set to the feeder link delay in an NTN where the reference point is at the base station or between the base station and the satellite, significant timing errors may occur because the actual feeder link delay may differ among UEs. For example, for UEs that have different service link delays, the net feeder link delay may involve one-way delays at different times. In particular, the net feeder link delay for a given UE includes a one-way (downlink) delay from the reference point to the satellite at a first time and a one-way (uplink) delay from the satellite to the reference point at a second time, where the first time and the second time are separated by the service link delay for the given UE. Accordingly, because the satellite moves between the first time (e.g., a time when the satellite receives a downlink signal to be relayed from the reference point to the UE) and the second time (e.g., a time when the satellite receives an uplink signal to be relayed from the UE to the reference point), UEs with different service link delays may have different feeder link delays. Setting the network-controlled common timing offset to the feeder link delay can therefore result in significant timing errors, especially in an NTN where communication with satellites and/or other nodes at high altitudes involve large round-trip delays.

Accordingly, some aspects described herein relate to signaling common timing offset parameters in an NTN such that a UE can compute a common timing offset based at least in part on a service link delay associated with the UE. For example, in some aspects, a base station in an NTN may transmit, to a UE, ephemeris information associated with a satellite, where the ephemeris information defines a trajectory (e.g., an astronomical position and/or velocity) of the satellite over time. In some aspects, as described herein, the satellite ephemeris information may be associated with an epoch time or a reference time, which may be configured to be the starting time of a downlink slot at a reference point where downlink and uplink slots are synchronized, and a slot duration is constant over time. Accordingly, as described in further detail herein, a base station may signal one or more common delay or timing offset parameters to a UE, and the UE may use the common delay or timing offset parameter(s) and the ephemeris information to compute a UE-specific transmit time for transmitting an uplink signal in a particular slot. For example, in some aspects, the one or more common delay or timing offset parameters may include a one-way delay from the satellite to the reference point for the targeted uplink slot, half of a round-trip time between the reference point and the satellite, a one-way delay from the reference point to the satellite for a downlink slot aligned in time with the targeted uplink slot, and/or a geometric distance between the satellite and the reference point divided by the speed of light at the time of the targeted uplink slot, among other examples. In this way, a UE that receives the one or more common delay or timing offset parameters may accurately compute a UE-specific transmit time for transmitting an uplink signal in a particular uplink slot based on the common delay or timing offset values, the ephemeris information, and the service link delay of the UE. Further details are provided below with reference to FIG. 4, FIGS. 5A-5D, and FIG. 6.

As indicated above, FIG. 3 is provided as an example. Other examples may differ from what is described with regard to FIG. 3.

FIG. 4 is a diagram illustrating an example 400 associated with signaling ephemeris information in an NTN, in accordance with the present disclosure. As shown in FIG. 4, example 400 includes communication between a UE (e.g., UE 120) and a base station in an NTN. For example, in some aspects, the base station may control communication between the UE and one or more satellites (not shown) (e.g., in a regenerative or transparent deployment, as described in more detail above with reference to FIG. 3). Furthermore, in some aspects, the base station and the UE may communicate in an NTN where a reference point is at a location other than the satellite (e.g., the reference point may be at the base station or another location in a path between the satellite and the base station, such as an RU, a DU, or any other physical entity or physical node that relays communications between the base station and the satellite).

As shown in FIG. 4, and by reference number 410, the base station may transmit, and the UE may receive, ephemeris information associated with a satellite in an NTN. In general, as described herein, ephemeris information may include various parameters that define orbital mechanics that can be used to describe or derive the location and orbital behavior of an astronomical body, such as a star or an Earth-orbiting object (e.g., the satellite in the NTN). For example, in some aspects, the ephemeris information signaled from the base station to the UE may be expressed in a two-line element (TLE) format, and may include a satellite number, one or more international designators (e.g., the last two digits of a launch year and/or a launch number of a year), an inclination in degrees, an eccentricity, a mean anomaly, a mean motion (e.g., revolutions per day), and/or one or more time derivatives of the mean motion, among other examples. Accordingly, the ephemeris information may generally express mean orbital parameters, filtering out short-term perturbations, whereby the UE can then use the ephemeris information and a simplified general propagation model to calculate a location of the satellite revolving about the Earth in True Equator, Mean Equinox (TEME) coordinates. The UE can then convert the location of the satellite into Earth-centered, Earth-fixed (ECEF) Cartesian x, y, z coordinates as a function of time (where the z-axis points to true North, and where the x-axis and y-axis intersect at zero (0) degrees latitude and zero (0) degrees longitude). Furthermore, the UE can use the ephemeris information to obtain the instantaneous velocity of the satellite at the time that the satellite is in a particular ECEF location.

As further shown in FIG. 4, and by reference number 420, the UE may determine an epoch time (or reference time) associated with the satellite ephemeris information. For example, as described in further detail herein, the epoch time may be defined to enable the UE to compute a common timing offset based on the location of the satellite at a time instant when an uplink signal transmitted by the UE is to arrive at the satellite or a reference point. For example, as described above, the reference point may be defined as the location in the NTN where downlink and uplink slots are synchronized (e.g., aligned in time with an offset given by $N_{TA,offset}$, which may have a zero or non-zero value) and a slot duration is constant over time, where the reference point may be at the base station or another location between the satellite and the base station. Accordingly, in some aspects, the epoch time or reference time for the ephemeris information may be defined as a starting time for a downlink slot at the reference point. For example, because the slot duration is uniform at the reference point, the slot duration is non-uniform at the satellite in cases where the reference point is at a location other than the satellite. The epoch time may therefore be defined as the starting time for a downlink slot at the reference point so that the UE can accurately determine the location of the satellite at the starting time of an uplink slot, which may be necessary to compute the service link delay. Otherwise, if the epoch time were to be defined based on timing at the satellite, the UE may be unable to accurately determine the location of the satellite at the starting time of an uplink slot because slots are non-uniform at the satellite when the reference point is at a location other than the satellite.

Accordingly, in some aspects, defining the epoch time to be the starting time of a downlink slot at the reference point may enable the UE to define a reference timing for computing a UE-specific transmit time for transmitting an uplink signal in an uplink slot. For example, in some aspects, the epoch time may be used to define a time based on the downlink and uplink slots that are synchronized at the reference point (e.g., a downlink and uplink are frame aligned at the reference point with an offset given by $N_{TA,offset}$), where the epoch time t=0 may corresponds to the starting time of a slot $K_0$ at the reference point. For example, the base station may signal the ephemeris information to the UE in a particular downlink slot, $K_0$, which may then be used to define the starting time for a satellite ephemeris epoch. In this way, by defining the epoch time to as the starting time for a downlink slot $K_0$ at the reference point in which the ephemeris information is signaled, the notation $t_N$ may be used to denote the starting time for an uplink slot Nat the reference point, where $t_N=(N-K_0)$ multiplied by the slot duration. Accordingly, by defining the epoch time as the starting time of a downlink slot at the reference point (e.g., the starting time of a downlink slot in which the ephemeris information is signaled), the UE can easily propagate the location of the satellite over time because uplink and downlink slots are synchronized at the reference point and have a uniform duration at the reference point. In this way, as described in further detail herein, the UE may determine one or more common timing offsets at different times (e.g., uplink and/or downlink feeder link delays based on relative locations of the satellite and the reference point at the different times), which can be used to determine the UE-specific transmit time for transmitting an uplink signal in a particular uplink slot.

As indicated above, FIG. 4 is provided as an example. Other examples may differ from what is described with regard to FIG. 4.

FIGS. 5A-5D are diagrams illustrating examples 500 associated with common timing offset signaling and UE transmit time calculation in an NTN, in accordance with the present disclosure. As shown in FIGS. 5A-5D, examples 500 include communication between a UE, a satellite, a reference point, and a base station. In some aspects, the reference point may be provided at the base station, or the reference point may be provided at a location between the satellite and the base station (e.g., at a physical node or entity in a communication path between the satellite and the base station, such as an RU or a DU of a disaggregated base station). In some aspects, the UE, the satellite, the reference point, and the base station may communicate in an NTN (e.g., in a regenerative or transparent deployment). In some aspects, at some point in time, denoted herein as downlink slot $K_0$, the base station may signal ephemeris information indicating the location of the satellite at the beginning of the downlink slot $K_0$ at the reference point. Accordingly, an epoch time for the ephemeris information may be defined as to, which corresponds to the starting time of the downlink slot $K_0$ at the reference point in which the ephemeris information is signaled. Furthermore, as described in further detail herein, the base station may signal one or more common delay or common timing offset parameters to the UE to enable the UE to compute a transmit time for transmitting an uplink signal in a particular uplink slot.

Figure 5A:
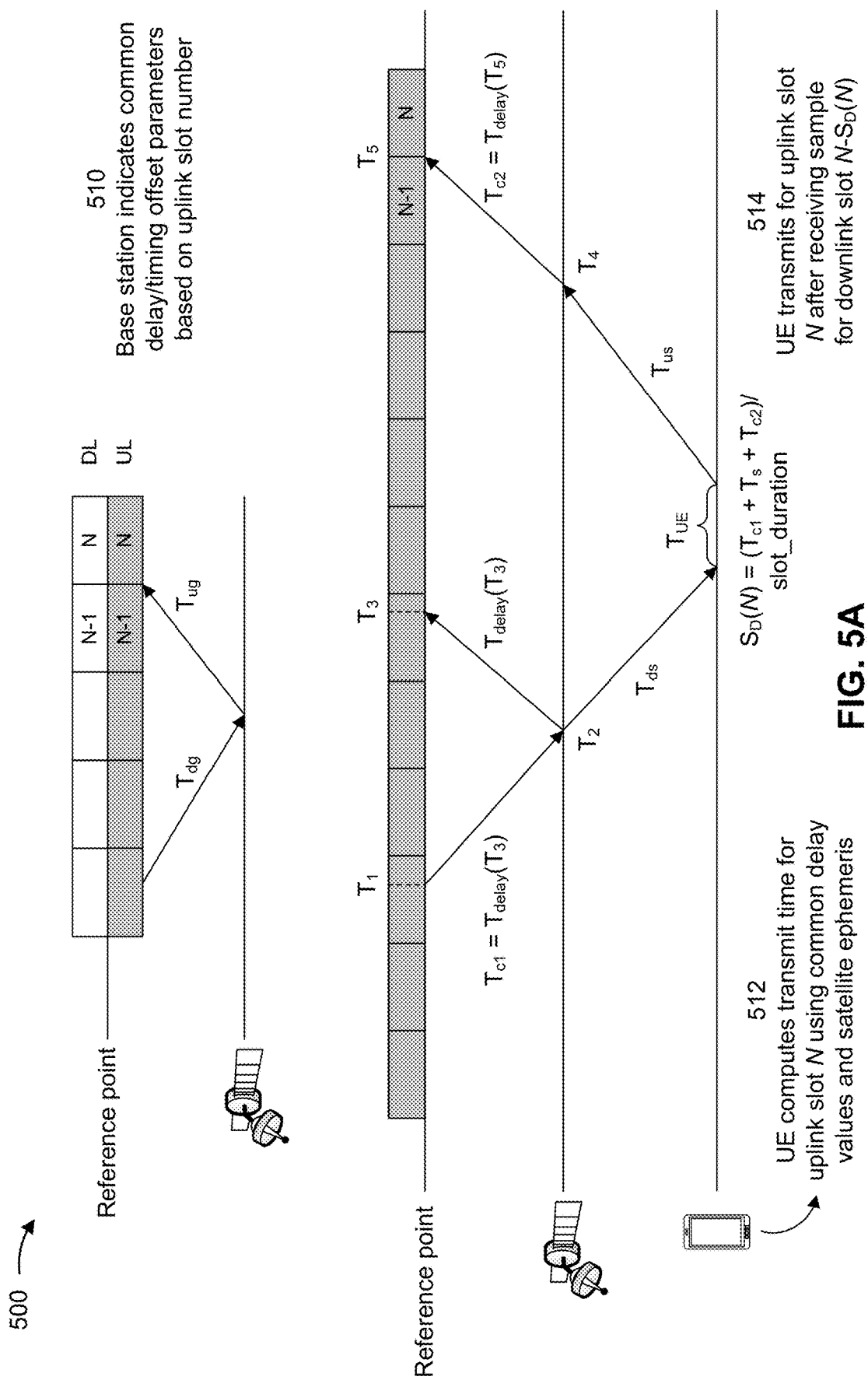
FIGS. 5A-5D are diagrams illustrating examples associated with common timing offset signaling and UE transmit time calculation in an NTN, in accordance with the present disclosure.

For example, as shown in FIG. 5A, and by reference number 510, the base station may transmit, and the UE may receive, signaling that indicates one or more common delay or common timing offset parameters (e.g., delay or timing offset parameters that are common to all UEs in the NTN or all UEs served by the satellite) based on an uplink slot number (e.g., an uplink slot in which an uplink signal is to arrive at the reference point). For example, the base station may signal the one or more common delay or common timing offset parameters in a system information block (SIB), a radio resource control (RRC) message, a medium access control (MAC) control element (MAC-CE), and/or downlink control information (DCI). In some aspects, the base station may transmit the signaling that indicates the one or more common delay or common timing offset parameters to the UE directly (e.g., without any intermediate device) or indirectly (e.g., via a satellite or other node). In some aspects, the UE may then use the one or more common delay or common timing offset parameters to compute a common delay or common timing offset ($T_{delay}$) for a particular uplink slot. For example, in order to determine the common delay or common timing offset for an uplink slot N, the UE may need to compute the common delay or common timing offset at time $t_N$, which generally corresponds to a starting time for uplink slot N. Accordingly, in one example, the common delay or common timing offset at time $t_N$ may be defined as a one-way delay from the satellite to the reference point for the uplink slot N that starts at time $t_N$, shown as $T_{ug}$ in FIG. 5A (e.g., $T_{delay}(t_N)=T_{ug}$). In other words, the common delay or common timing offset at time $t_N$ may be defined as the one-way delay of a hypothetical transmission from the satellite to the reference point such that an arrival time of the transmission at the reference point is $t_N$ (e.g., the starting time of uplink slot N).

Alternatively, in some aspects, the common delay or timing offset at time $t_N$ may be defined as half of the round-trip time between the reference point and the satellite for the uplink slot N that starts at time $t_N$. For example, the round-trip time between the reference point and the satellite for the uplink slot N may be the round-trip time for a hypothetical transmission to travel from the reference point to the satellite and then from the satellite back to the reference point such that the hypothetical transmission is received at the reference point at the starting time of uplink slot N (e.g., at time $t_N$). In this case, the round-trip time may include a one-way delay for the hypothetical transmission to travel from the reference point to the satellite, denoted as $T_{dg}$ in FIG. 5A, and a one-way delay for the hypothetical transmission to travel from the satellite to the reference point, denoted as $T_{ug}$ in FIG. 5A. Accordingly, when the common delay or timing offset at time $t_N$ may be defined as half of the round-trip time between the reference point and the satellite for the uplink slot N that starts at time $t_N$, the common delay or timing offset may be defined such that $T_{delay}(t_N)=(T_{dg}+T_{ug})/2$. In this case, because the satellite location is the same at the time that the hypothetical transmission is received from the reference point and the time that the hypothetical transmission is transmitted back to the reference point, the difference between $T_{dg}$ and $T_{ug}$ may depend only on movement of the reference point (e.g., due to the rotation of the Earth).

Accordingly, in some aspects, the common delay or common timing offset parameters may include a common delay or timing offset value at a particular time instant and one or more derivatives of the common delay or timing offset at the particular time instant (e.g., first and higher-order derivatives). For example, an actual transmission from the satellite to the reference point (or vice versa) is not instantaneous (e.g., limited by the speed of light), whereby the satellite and/or the reference point may change locations during the transmission time. For example, the reference point may move due to the rotation of the Earth, and the satellite may move in an orbital trajectory around the Earth. The satellite movement in a particular time period is therefore likely to be much larger than the reference point movement in the same time period (e.g., if a signal takes 10 milliseconds to travel from the reference point to a satellite traveling at around 7000 meters per second, the satellite may move by about 70 meters during the transmission time). Depending on the direction in which the satellite is moving, the change in location during the transmission time can lead to a large error if the common delay or timing offset parameters were to consider only the relative locations of the satellite and the reference point at the time of transmission. Accordingly, as described herein, the one-way delay from the satellite to the reference point and/or the round-trip time between the reference point and the satellite may be based on a difference in the location of the transmitter at a first time when a signal is transmitted and the location of the receiver at a second time when the signal is received. The difference in location may indicate a total distance that the signal travels, which may be divided by the speed of light to determine the downlink delay $T_{dg}$ from the reference point to the satellite and/or the uplink delay $T_{ug}$ from the satellite to the reference point. Accordingly, based on the common delay or common timing offset at a particular time instant and the one or more derivatives of the common delay or timing offset at the particular time instant, the UE may compute the common delay or common timing offset at other times, and the UE may use the common delay or common timing offset to determine a transmit time for transmitting an uplink signal in a particular uplink slot. For example, the TA for a particular slot N may generally be defined as a time difference between a first time when the UE transmits an uplink signal in uplink slot N and a second time when the UE receives a downlink signal in downlink slot N. Accordingly, in cases where the uplink and downlink slots are synchronized at the reference point, transmission of the uplink signal in uplink slot N at the UE occurs before the UE receives the downlink signal in downlink slot N. Accordingly, applying a particular TA value in an uplink slot may require non-causal behavior, whereby the UE may instead compute a transmit time for transmitting an uplink signal in a particular uplink slot.

For example, as shown in FIG. 5A, and by reference number 512, the UE may compute the transmit time for an uplink slot N using the common delay values signaled by the base station and the satellite ephemeris information, which has an epoch time to that corresponds to the starting time of a downlink slot $K_0$ at the reference point in which the ephemeris information is signaled. In particular, FIG. 5A illustrates an example where the UE is computing a transmit time for an uplink signal to arrive at the reference point at time $T_5$, which is the starting point of uplink slot N (e.g., $t_N=T_5$). Accordingly, as shown, the UE may use the common delay values and the satellite ephemeris information to compute $T_{delay}(T_5)$, which corresponds to the one-way delay from the satellite to the reference point for uplink slot N or half of the round-trip time between the reference point and the satellite for uplink slot N. Accordingly, an uplink feeder link delay from the satellite to the reference point, $T_{c2}$, may be set to $T_{delay}(T_5)$, which may define a time $T_4$ when an uplink signal needs to be transmitted by the satellite in order to arrive at the reference point at time $T_5$ (e.g., $T_4=T_5-T_{c2}$). The UE may then compute a service link delay $T_5$ (e.g., based on the closed-loop and/or open-loop parameters described above), where $T_5$ is round-trip delay for a transmission to arrive at the satellite at time $T_4$. For example, as shown in FIG. 5A, the round-trip delay for a transmission to arrive at the satellite at time $T_4$ may be the sum of a first one-way delay, $T_{ds}$, for a downlink signal to travel from the satellite to the UE and a second one-way delay, $T_{us}$, for an uplink signal to travel from the UE to the satellite plus a UE processing delay, $T_{UE}$ (e.g., $T_s=T_{ds}+T_{UE}+T_{us}$). Accordingly, the UE may determine a time $T_2$ when a downlink signal needs to be transmitted from the satellite to the UE such that $T_2=T_4-T_5$, and the UE may then compute a time $T_3$ when the reference point would receive a hypothetical transmission from the satellite to the reference point starting from time $T_2$. For example, the UE may compute the time $T_3$ such that $T_3-T_{delay}(T_3)=T_2$, and may set the downlink feeder link delay, $T_{c1}$, to $T_{delay}(T_3)$, where $T_{delay}(T_3)$ may have a value corresponding to a one-way delay for a hypothetical transmitting that is transmitted by the satellite and time $T_2$ and arrives at the reference point at time $T_3$. Accordingly, as shown, the UE may compute a slot delay for uplink slot N, denoted $S_D(N)$, as the sum of the downlink feeder link delay, the service link delay, and the uplink feeder link delay divided by the slot duration, which is given by $(T_{c1}+T_s+T_{c2})$/slot duration, where the slot delay may be a whole number or a fractional number of slots. In this way, the UE may compute the transmit time associated with an uplink signal to be received at the reference point in uplink slot N, and may transmit the uplink signal at the transmit time such that the uplink signal arrives at the reference point at the starting time of uplink slot N. For example, as shown by reference number 514, the UE may use a received downlink signal to determine the transmit time, where the UE may start to transmit the uplink signal for uplink slot N (e.g., to the reference point via the satellite) after receiving a sample corresponding to downlink slot $N-S_D(N)$.

Figure 5B:
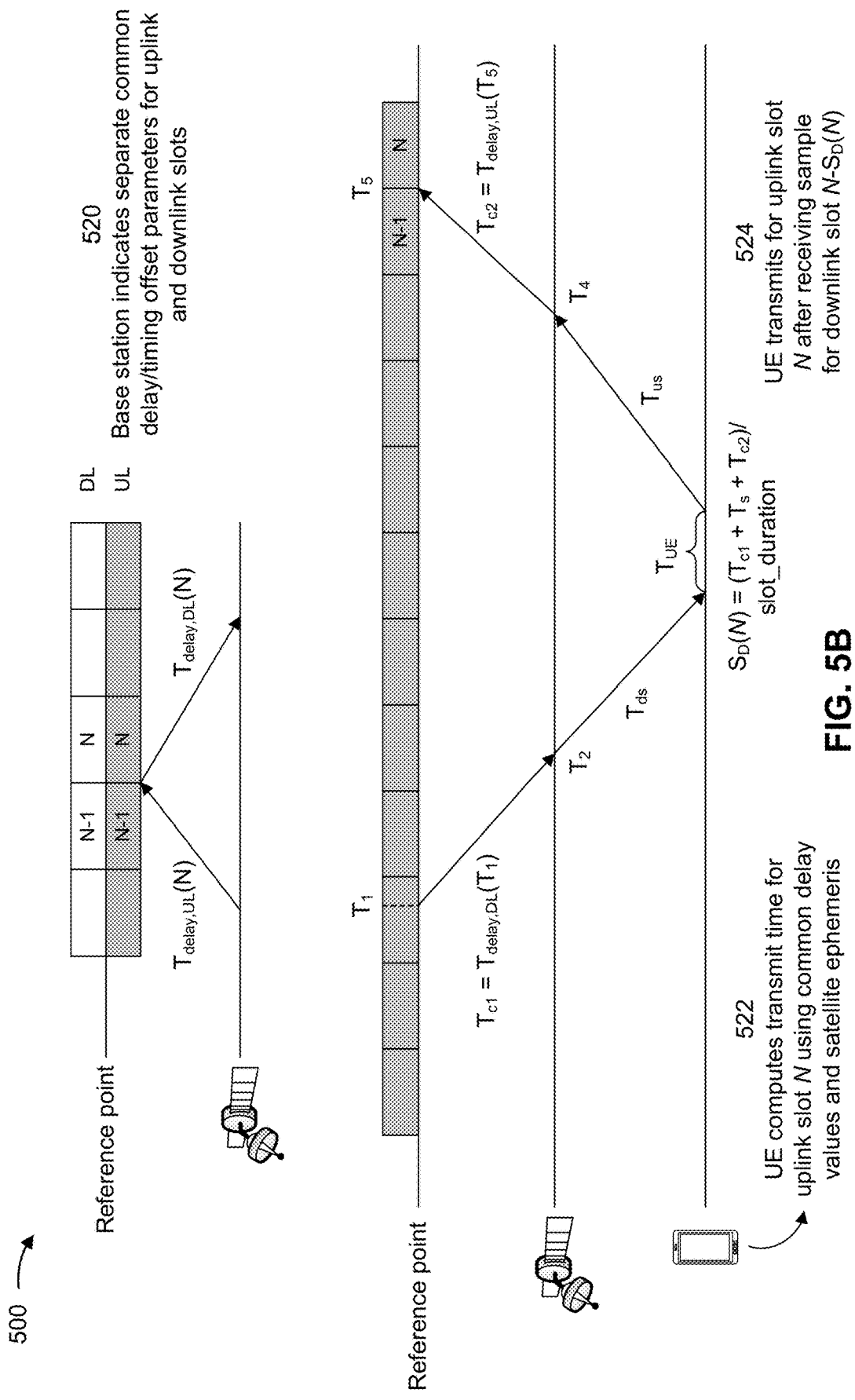

Alternatively, as shown in FIG. 5B, and by reference number 520, the base station may transmit, and the UE may receive, signaling that indicates separate common delay or common timing offset parameters for uplink and downlink slots. For example, the base station may signal the one or more common delay or common timing offset parameters in a SIB, an RRC message, a MAC-CE, and/or DCI, and the UE may use the separate common delay or common timing offset parameters for the uplink and downlink slots in order to compute a first common delay or common timing offset $(T_{delay,UL})$ for an uplink slot and a second common delay or common timing offset $(T_{delay,DL})$ for a downlink slot. For example, in some aspects, an uplink common delay or common timing offset at time $t_N$ may be defined as a one-way delay from the satellite to the reference point for the uplink slot N that starts at the reference point at time $t_N$, shown as $T_{delay,UL}(N)$ in FIG. 5B, and a downlink common delay or common timing offset at time $t_N$ may be defined as a one-way delay from the reference point to the satellite for the downlink slot N that starts at the reference point at time $t_N$, shown as $T_{delay,DL}(N)$ in FIG. 5B.

Accordingly, in some aspects, the common delay or common timing offset parameters that are signaled to the UE may include an uplink common delay or timing offset value and a downlink common delay or timing value at a particular time instant and one or more derivatives of the common delay or timing offset values at the particular time instant (e.g., first and higher-order derivatives). For example, the uplink common delay or common timing offset may indicate the one-way delay associated with a signal that arrives at the reference point from the satellite at the beginning of uplink slot N (e.g., at time $t_N$) and the downlink common delay or common timing offset may indicate the one-way delay associated with a signal that is transmitted from the reference point to the satellite at the beginning of downlink slot N (e.g., at time $t_N$). In this way, based on the uplink and downlink common delay or common timing offset values at a particular time instant and the one or more derivatives of the common delay or timing offset values at the particular time instant, the UE may compute the uplink and downlink common delay or common timing offset values at other times based on the ephemeris information associated with the satellite.

For example, as shown in FIG. 5B, and by reference number 522, the UE may compute the transmit time for an uplink slot N using the common delay values signaled by the base station and the satellite ephemeris information, which has an epoch time to that corresponds to the starting time of a downlink slot $K_0$ in which the ephemeris information is signaled. In particular, FIG. 5B illustrates an example where the UE is computing a transmit time for an uplink signal to arrive at the reference point at time $T_5$, which is the starting point of uplink slot N (e.g., $t_N=T_5$). Accordingly, as shown, the UE may use the common delay values and the satellite ephemeris information to compute $T_{delay,UL}(T_5)$, which corresponds to the one-way delay from the satellite to the reference point for a transmission to arrive at the reference point at the start of uplink slot N. Accordingly, the uplink feeder link delay from the satellite to the reference point, $T_{c2}$, may be set to $T_{delay,UL}(T_5)$, which defines the time $T_4$ when an uplink signal needs to be transmitted by the satellite to arrive at the reference point at time $T_5$ (e.g., $T_4=T_5-T_{c2}$). The UE may then compute a service link delay $T_5$ in a similar manner as described above with reference to FIG. 5A, where $T_5$ is defined as a round-trip delay between the satellite and the UE for a transmission to arrive at the satellite at time $T_4$. For example, as shown in FIG. 5B, the service link delay, $T_5$, may be defined as the sum of a first one-way delay, $T_{ds}$, for a downlink signal to travel from the satellite to the UE and a second one-way delay, $T_{us}$, for an uplink signal to travel from the UE to the satellite plus a UE processing delay, $T_{UE}$ (e.g., $T_s=T_{ds}+T_{UE}+T_{us}$). Accordingly, the UE may determine a time $T_2$ when a downlink signal needs to be transmitted from the satellite to the UE such that $T_2=T_4-T_5$, and the UE may then compute a time $T_1$ when the reference point would need to transmit a downlink signal to the satellite such that the downlink signal is received at the satellite at time $T_2$. For example, the UE may compute the time $T_1$ such that $T_1+T_{delay,DL}(T_1)=T_2$, and the UE may set the downlink feeder link delay, $T_{c1}$, to $T_{delay,DL}(T_1)$, where $T_{delay,DL}(T_1)$ is a one-way delay from the reference point to the satellite for a downlink transmission performed at time $T_1$. Accordingly, as shown, the UE may compute the slot delay for uplink slot N, denoted $S_D(N)$, as the sum of the downlink feeder link delay, the service link delay, and the uplink feeder link delay divided by the slot duration, which is given by $(T_{c1}+T_s+T_{c2})$/slot duration, where the slot delay may be a whole number or a fractional number of slots. In this way, the UE may compute the transmit time associated with an uplink signal to be received at the reference point in uplink slot N, and may transmit the uplink signal at the transmit time such that the uplink signal arrives at the reference point at the starting time of uplink slot N. For example, as shown by reference number 524, the UE may use a received downlink signal to determine the transmit time, where the UE may start to transmit the uplink signal for uplink slot N (e.g., to the reference point via the satellite) after receiving a sample corresponding to downlink slot $N-S_D(N)$.

Figure 5C:
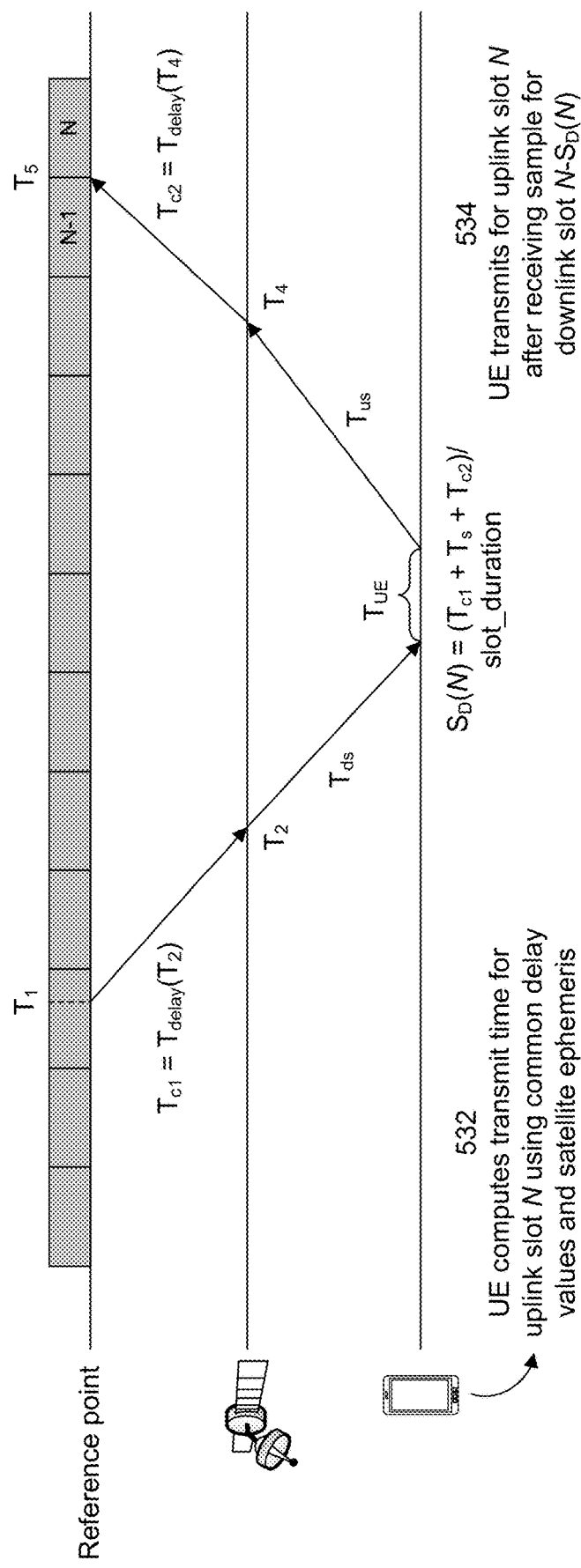

Alternatively, as shown in FIG. 5C, and by reference number 530, the base station may transmit, and the UE may receive, signaling that indicates approximate common delay or common timing offset parameters for an uplink slot. For example, the base station may signal the approximate common delay or common timing offset parameters in a SIB, an RRC message, a MAC-CE, and/or DCI, and the UE may use the approximate common delay or common timing offset parameters for the uplink slot in order to compute a common delay or common timing offset for an uplink slot N that starts at time $t_N$. For example, in some aspects, the common delay or timing offset at time $t_N$ may be approximated based on the geometric distance between the location of the satellite at time $t_N$ and the location of the reference point at time $t_N$ divided by the speed of light, c. In other words, the common delay or timing offset value at time $t_N$ may be given by $T_{delay}(t_N)=\|s(t_N)-r(t_N)\|/c$, where s(t) is the location of the satellite at time t and r(t) is the location of the reference point at time t. In this case, the approximate common delay or timing offset may differ from the one-way delay for a transmission starting from the satellite that arrives at the reference point at time $t_N$ and/or a transmission starting from the reference point at time $t_N$ because the satellite and/or the reference point may move between transmission and reception times. Accordingly, as described herein, the UE may approximate the common delay between the satellite and the reference point at a particular time based on the location of the satellite at the particular time since the satellite is typically moving at a faster rate. In other words, the distance used may be calculated using the position of the satellite at a time when the satellite performs reception and/or transmission of a signal.

For example, as shown in FIG. 5C, and by reference number 532, the UE may compute the transmit time for an uplink slot N using the approximate common delay value signaled by the base station and the satellite ephemeris information. In particular, FIG. 5C illustrates an example where the UE is computing a transmit time for an uplink signal to arrive at the reference point at time $T_5$, which is the starting point of uplink slot N (e.g., $t_N=T_5$). Accordingly, the actual delay for an uplink signal to arrive at the reference point at time $T_5$ may be based on the geometric distance between the location of the reference point at time $T_5$ and the location of the satellite at time $T_4$. Accordingly, to minimize errors, the geometric distance between the location of the reference point at time $T_5$ and the location of the satellite at time $T_4$ may be approximated by the geometric distance between the locations of the reference point and the satellite at time $T_4$. In this way, the UE may compute the uplink feeder link delay, $T_{c2}$, based on the geometric distance between the locations of the reference point and the satellite at time $T_4$ divided by the speed of light. Accordingly, the UE may compute $T_4$ such that $T_4+T_{delay}(T_4)=T_5$, and may set the uplink feeder link delay from the satellite to the reference point, $T_{c2}$, to be $T_{delay}(T_4)$. The UE may then compute a service link delay $T_5$ in a similar manner as described above with reference to FIGS. 5A-5B, where $T_5$ is defined as a round-trip delay between the satellite and the UE for a transmission to arrive at the satellite at time $T_4$. For example, as shown, the service link delay, $T_5$, may be defined as the sum of a first one-way delay, $T_{ds}$, for a downlink signal to travel from the satellite to the UE and a second one-way delay, $T_{us}$, for an uplink signal to travel from the UE to the satellite plus a UE processing delay, $T_{UE}$ (e.g., $T_s = T_{ds} + T_{UE} + T_{us}$). Accordingly, the UE may determine a time $T_2$ when a downlink signal needs to be transmitted from the satellite to the UE such that $T_2 = T_4 - T_5$, and the UE may then compute the downlink feeder link delay, $T_{c1}$, based on the approximate common delay that is based on the geometric distance between the satellite and the reference point at time $T_2$ (e.g., $T_{c1} = T_{delay}(T_2)$). As shown, the UE may then compute a slot delay for uplink slot N, denoted $S_D(N)$, as the sum of the downlink feeder link delay, the service link delay, and the uplink feeder link delay divided by the slot duration, which is given by $(T_{c1} + T_s + T_{c2})$/slot duration. In this way, the UE may compute the transmit time associated with an uplink signal to be received at the reference point in uplink slot N based on a time when a downlink signal is received. For example, as shown by reference number 534, the UE may start to transmit the uplink signal for uplink slot N (e.g., to the reference point via the satellite) after receiving a sample corresponding to downlink slot $N - S_D(N)$.

Figure 5D:
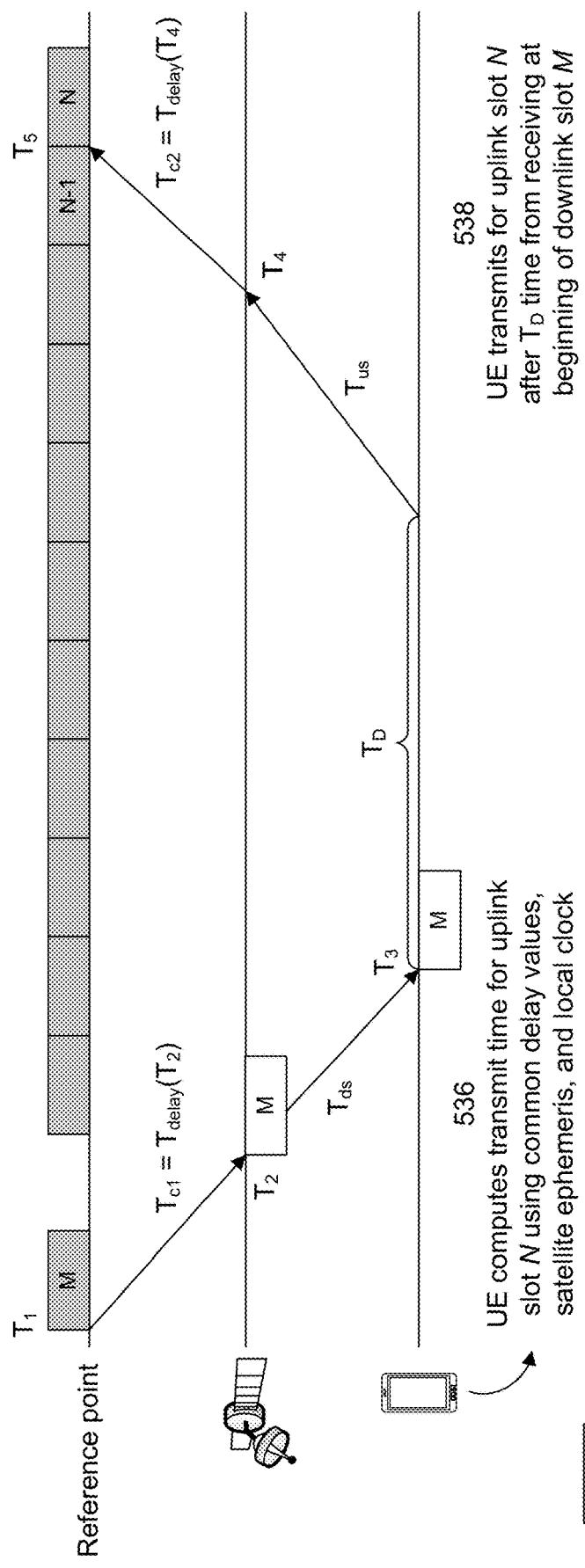

Alternatively, as shown in FIG. 5D, and by reference number 536, the UE may use a local clock to determine the transmit time (e.g., based on a downlink slot N in which the UE achieves downlink synchronization (e.g., determines downlink timing), such as slot $K_0$ when the reference point transmits the satellite ephemeris information). For example, in FIG. 5D, the UE may compute the transmit time for uplink slot N, which arrives at the reference point at time $T_5 = t_N$, using the common delay values (e.g., feeder link delay values) and satellite ephemeris information. For example, based on the time $T_5$ when the uplink signal is to arrive at the reference point and the feeder link delay based on the approximate geometric distance between the satellite and the reference point at time $T_4$, $T_{delay}(T_4)$, the UE may compute $T_4$ such that $T_4 + T_{delay}(T_4) = T_5$. The UE may then set the feeder link delay, $T_{c2} = T_{delay}(T_4)$, and may calculate the uplink service link delay, Tus, as a one-way service link delay for a transmission arriving at the satellite at time $T_4 = T_5 - T_{c2}$. Accordingly, based on the downlink slot M in which the UE achieves downlink synchronization, which is the downlink slot associated with a downlink signal transmitted from the reference point at time $T_1 = t_M$, the UE may then compute $T_2$ such that $T_2 = T_1 + T_{delay}(T_2)$, and may set $T_{c1M} = T_{delay}(T_2)$. The UE may further compute a downlink service link delay, $T_{dsM}$, as the one-way service link delay for a transmission starting at the satellite at time $T_2$, and may compute a time delay $T_D = (N-M)*\text{slot\_duration} - (T_{c1M} + T_{dsM} + T_{us} + T_{c2})$. Accordingly, as shown by reference number 538, the UE may transmit the uplink signal for uplink slot N (e.g., to the reference point via the satellite) the time delay $T_D$ after the time when receiving the beginning of downlink slot M.

As indicated above, FIGS. 5A-5D are provided as examples. Other examples may differ from what is described with regard to FIGS. 5A-5D.

Figure 6:
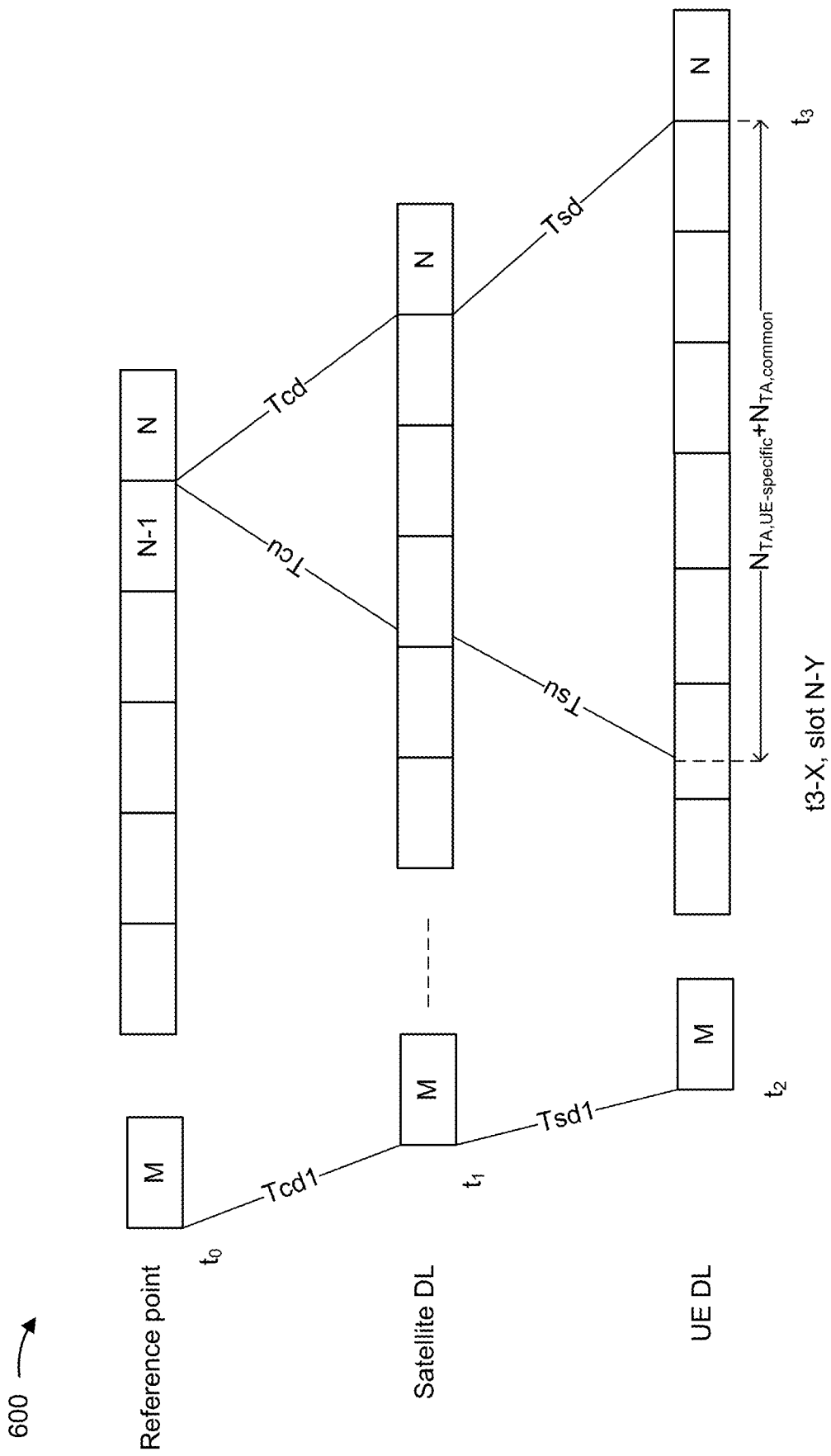
FIG. 6 is a diagram illustrating an example associated with a direct uplink transmit time calculation in an NTN, in accordance with the present disclosure.

FIG. 6 is a diagram illustrating an example 600 associated with a direct uplink transmit time calculation in an NTN, in accordance with the present disclosure. As shown in FIG. 6, example 600 includes communication between a UE, a satellite, and a reference point, which may be provided at a base station or a location between the base station and the satellite. In some aspects, the UE, the satellite, and the reference point may communicate in an NTN (e.g., in a regenerative or transparent deployment). In some aspects, as described herein, the UE may compute a transmit time for transmitting an uplink signal in an uplink slot N based on a local clock.

In some aspects, in order to directly compute a transmit time for transmitting an uplink signal in an uplink slot N, the UE may predict the transmit time of downlink slot N. For example, as shown in FIG. 6, the UE may receive a signal transmitted by the reference point in downlink slot N at time $t_2$, and the UE may calculate Tcd1 and Tsd1 representing the downlink feeder link delay and the downlink service link delay to determine the starting time of downlink slot N at the reference point as $t_0 = t_2 - \text{Tcd1} - \text{Tsd1}$. Furthermore, the UE may determine that the downlink transmit time of slot N is $t_0 + (N-M)*Ds$, where Ds is the slot duration.

In some aspects, the UE may further calculate the uplink feeder link and uplink service link delays, Tcu and Tsu. For example, to calculate Tcu, the UE may consider the arrival time of the uplink transmission for slot N as $t_0 + (N-M)*Ds$. In cases where the distance between the satellite and the reference point is signaled to the UE, the UE may determine Tcu as $\text{Tcu} = f(t_0 + (N-M)*Ds - \text{Tcu})$, where $f(t)$ is a common TA for time t corresponding to a distance between the satellite and the reference point at time t divided by the speed of light. The UE then calculates Tsu for the uplink transmission arriving at the satellite at time $t_0 + (N-M)*Ds - \text{Tcu}$. At this time instant, the downlink at the reference point corresponds to slot $N - \text{Tcu}/Ds$, where the term slot is used in FIG. 6 to indicate a time with possible fractional numbers. However, the downlink at the satellite at this time instant corresponds to an earlier downlink transmitted from the reference point. Because the UE does not know directly the downlink slot time at the satellite, the UE calculation may be simplified in cases where the epoch time or reference time associated with the satellite ephemeris is at the reference point.

In some aspects, after the UE has calculated the above transmission delays (e.g., downlink feeder link and service link delays and uplink feeder link and service link delays), the UE may determine the transmit time of for slot N as $t_0 + (N-M)*Ds - \text{Tcu} - \text{Tsu}$. In this example, $t_3$ (e.g., representing the predicted time when the beginning of downlink slot N is received at the UE) may be set to $t_0 + (N-M)*Ds + \text{Tcd} + \text{Tsd}$, and the open-loop TA relative to $t_3$ is $X = \text{Tsu} + \text{Tcu} + \text{Tcd} + \text{Tsd}$. Further, the downlink signal received at this time corresponds to slot $N-Y$, where Y is a number of slots between a slot in which an uplink transmission is performed and downlink reception corresponding to slot N, where $X*Ds$ may differ from $Y*Ds$ in terms of time based on the downlink signal, which is non-uniform with respect to an ideal clock. X, on the other hand, is in terms of a time difference in terms of an ideal clock, and a difference between X and Y can be up to 2 microseconds assuming a 20 millisecond one-way delay and a 100 microsecond per second round-trip timing variation rate.

As indicated above, FIG. 6 is provided as an example. Other examples may differ from what is described with regard to FIG. 6.

Figure 7:
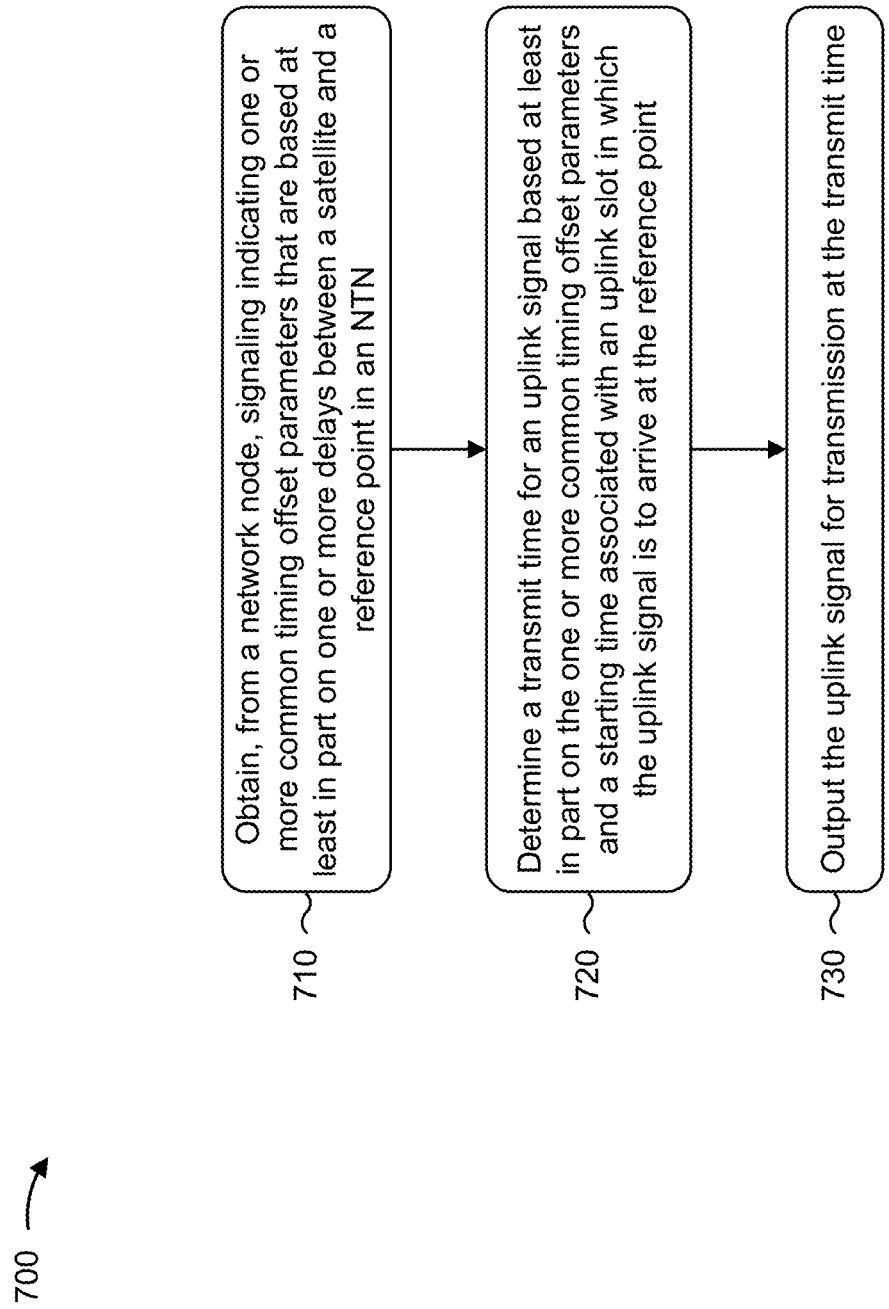
FIGS. 7-8 are diagrams illustrating example processes associated with common timing offset signaling in an NTN, in accordance with the present disclosure.

FIG. 7 is a diagram illustrating an example process 700 performed, for example, by an apparatus, in accordance with the present disclosure. Example process 700 is an example where the apparatus (e.g., UE 120) performs operations associated with common timing offset signaling in an NTN.

As shown in FIG. 7, in some aspects, process 700 may include obtaining, from a network node, signaling indicating one or more common timing offset parameters that are based at least in part on one or more delays between a satellite and a reference point in an NTN (block 710). For example, the apparatus (e.g., using communication manager 140 and/or reception component 902, depicted in FIG. 9) may obtain, from a network node, signaling indicating one or more common timing offset parameters that are based at least in part on one or more delays between a satellite and a reference point in an NTN, as described above.

As further shown in FIG. 7, in some aspects, process 700 may include determining a transmit time for an uplink signal based at least in part on the one or more common timing offset parameters and a starting time associated with an uplink slot in which the uplink signal is to arrive at the reference point (block 720). For example, the apparatus (e.g., using communication manager 140 and/or determination component 908, depicted in FIG. 9) may determine a transmit time for an uplink signal based at least in part on the one or more common timing offset parameters and a starting time associated with an uplink slot in which the uplink signal is to arrive at the reference point, as described above.

As further shown in FIG. 7, in some aspects, process 700 may include outputting the uplink signal for transmission at the transmit time (block 730). For example, the apparatus (e.g., using communication manager 140 and/or transmission component 904, depicted in FIG. 9) may output the uplink signal for transmission at the transmit time, as described above.

Process 700 may include additional aspects, such as any single aspect or any combination of aspects described below and/or in connection with one or more other processes described elsewhere herein.

In a first aspect, the reference point corresponds to a location in the NTN where downlink slots and uplink slots are synchronized and a slot duration is constant over time.

In a second aspect, alone or in combination with the first aspect, the reference point is at the network node.

In a third aspect, alone or in combination with the first aspect, the reference point is in a path between the satellite and the network node.

In a fourth aspect, alone or in combination with one or more of the first through third aspects, process 700 includes obtaining, from the network node, signaling that indicates ephemeris information associated with the satellite, wherein the transmit time is further based at least in part on an epoch time for the ephemeris information.

In a fifth aspect, alone or in combination with the fourth aspect, the epoch time for the ephemeris information is at a starting time for a downlink slot at the reference point.

In a sixth aspect, alone or in combination with one or more of the first through fifth aspects, the one or more common timing offset parameters include one or more of values for the one or more delays between the satellite and the reference point or one or more derivatives of the one or more delays between the satellite and the reference point.

In a seventh aspect, alone or in combination with one or more of the first through sixth aspects, the one or more common timing offset parameters include a one-way delay from the satellite to the reference point for a transmission to arrive at the reference point at a starting time of an uplink slot at the reference point.

In an eighth aspect, alone or in combination with one or more of the first through seventh aspects, the one or more common timing offset parameters include half of a round-trip delay between the reference point and the satellite for a transmission to arrive at the reference point at a starting time of an uplink slot at the reference point.

In a ninth aspect, alone or in combination with one or more of the first through eighth aspects, the one or more common timing offset parameters include a one-way delay from the reference point to the satellite for a transmission performed by the reference point at a starting time of a downlink slot at the reference point.

In a tenth aspect, alone or in combination with one or more of the first through ninth aspects, the one or more common timing offset parameters include a geometric distance between the reference point and the satellite at a starting time of an uplink slot at the reference point.

In an eleventh aspect, alone or in combination with one or more of the first through tenth aspects, the one or more common timing offset parameters are indicated in a SIB, an RRC message, a MAC-CE, or DCI.

In a twelfth aspect, alone or in combination with one or more of the first through eleventh aspects, the transmit time is UE-specific.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
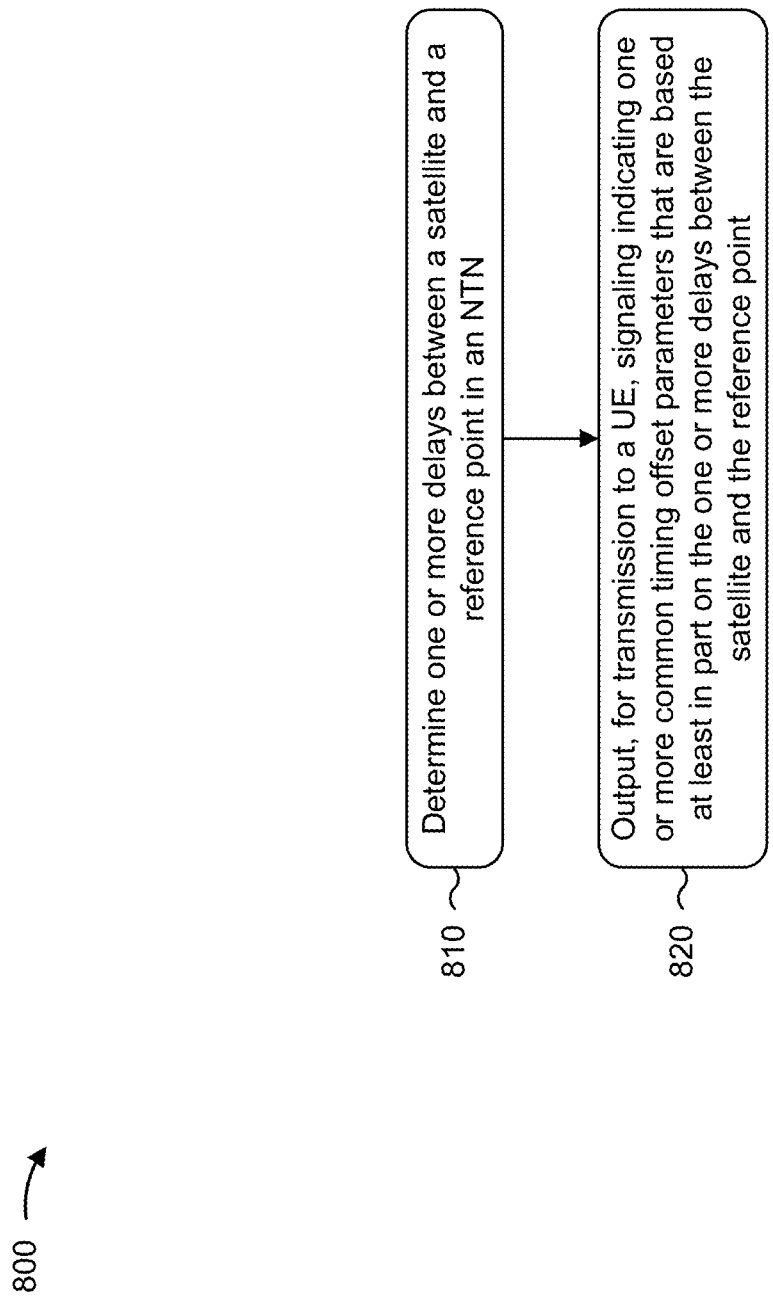

FIG. 8 is a diagram illustrating an example process 800 performed, for example, by an apparatus, in accordance with the present disclosure. Example process 800 is an example where the apparatus (e.g., a network node, such as base station 110) performs operations associated with common timing offset signaling in an NTN.

As shown in FIG. 8, in some aspects, process 800 may include determining one or more delays between a satellite and a reference point in an NTN (block 810). For example, the apparatus (e.g., using communication manager 150 and/or determination component 1008, depicted in FIG. 10) may determine one or more delays between a satellite and a reference point in an NTN, as described above.

As further shown in FIG. 8, in some aspects, process 800 may include outputting, for transmission to a UE, signaling indicating one or more common timing offset parameters that are based at least in part on the one or more delays between the satellite and the reference point (block 820). For example, the apparatus (e.g., using communication manager 150 and/or transmission component 1004, depicted in FIG. 10) may output, for transmission to a UE, signaling indicating one or more common timing offset parameters that are based at least in part on the one or more delays between the satellite and the reference point, as described above.

Process 800 may include additional aspects, such as any single aspect or any combination of aspects described below and/or in connection with one or more other processes described elsewhere herein.

In a first aspect, the reference point corresponds to a location in the NTN where downlink slots and uplink slots are synchronized and a slot duration is constant over time.

In a second aspect, alone or in combination with the first aspect, the reference point is at the apparatus.

In a third aspect, alone or in combination with the first aspect, the reference point is in a path between the satellite and the apparatus.

In a fourth aspect, alone or in combination with one or more of the first through third aspects, process 800 includes outputting, for transmission to the UE, signaling that indicates ephemeris information associated with the satellite, wherein the one or more common timing offset parameters are further based at least in part on an epoch time for the ephemeris information.

In a fifth aspect, alone or in combination with the fourth aspect, the epoch time for the ephemeris information is at a starting time for a downlink slot at the reference point.

In a sixth aspect, alone or in combination with one or more of the first through fifth aspects, the one or more common timing offset parameters include one or more of values for the one or more delays between the satellite and the reference point or one or more derivatives of the one or more delays between the satellite and the reference point.

In a seventh aspect, alone or in combination with one or more of the first through sixth aspects, the one or more common timing offset parameters include a one-way delay from the satellite to the reference point for a transmission to arrive at the reference point at a starting time of an uplink slot at the reference point.

In an eighth aspect, alone or in combination with one or more of the first through seventh aspects, the one or more common timing offset parameters include half of a round-trip delay between the reference point and the satellite for a transmission to arrive at the reference point at a starting time of an uplink slot at the reference point.

In a ninth aspect, alone or in combination with one or more of the first through eighth aspects, the one or more common timing offset parameters include a one-way delay from the reference point to the satellite for a transmission performed by the reference point at a starting time of a downlink slot at the reference point.

In a tenth aspect, alone or in combination with one or more of the first through ninth aspects, the one or more common timing offset parameters include a geometric distance between the reference point and the satellite at a starting time of an uplink slot at the reference point.

In an eleventh aspect, alone or in combination with one or more of the first through tenth aspects, the one or more common timing offset parameters are indicated in a SIB, an RRC message, a MAC-CE, or DCI.

In a twelfth aspect, alone or in combination with one or more of the first through eleventh aspects, process 800 includes obtaining, from the UE, an uplink signal that was transmitted at a UE-specific transmit time that is based at least in part on the one or more common timing offset parameters and a starting time associated with an uplink slot in which the uplink signal is to arrive at the reference point.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
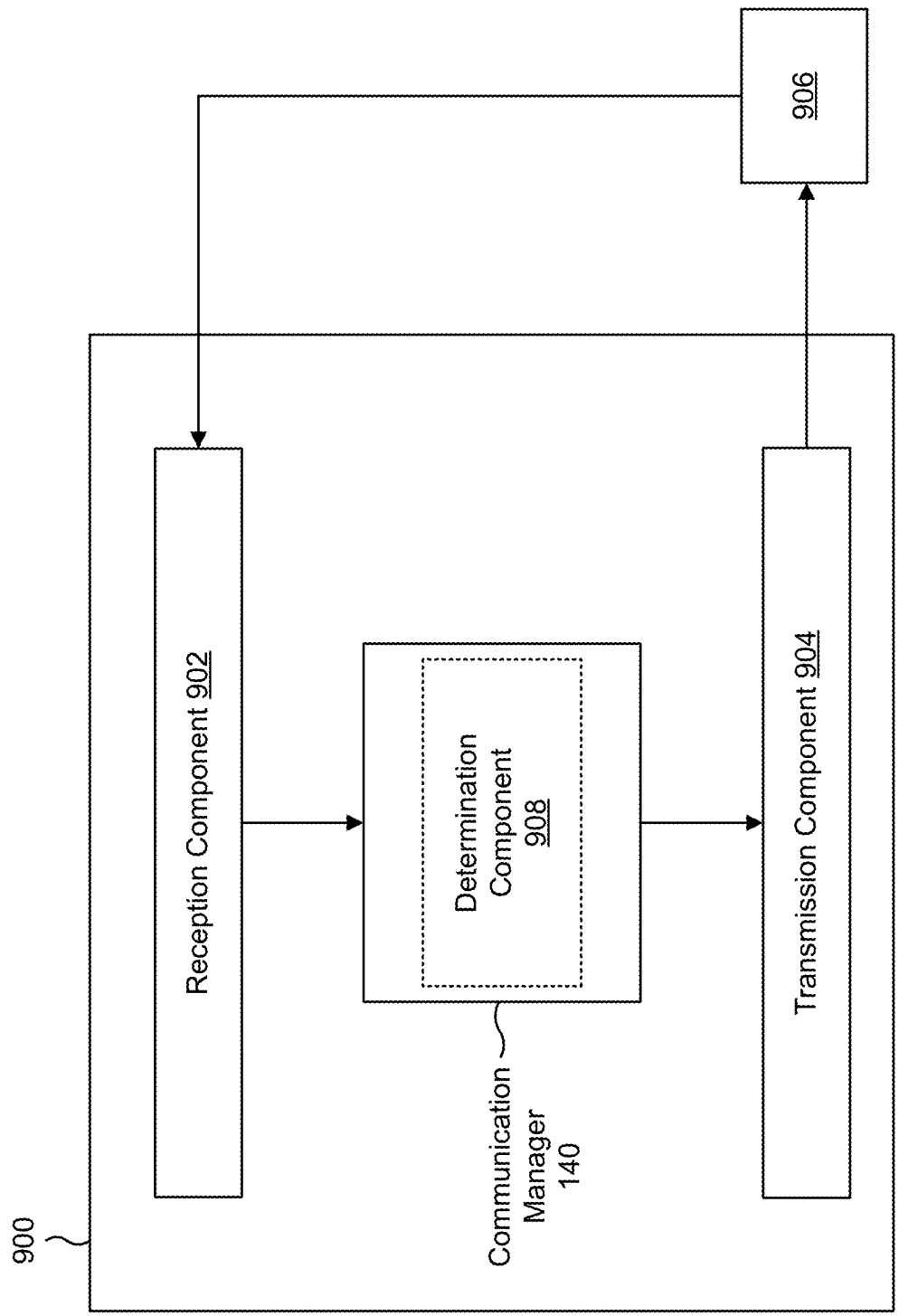
FIGS. 9-10 are diagrams of example apparatuses for wireless communication, in accordance with the present disclosure.

FIG. 9 is a diagram of an example apparatus 900 for wireless communication. The apparatus 900 may be a UE, or a UE may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904. As further shown, the apparatus 900 may include the communication manager 140. The communication manager 140 may include a determination component 908, among other examples.

In some aspects, the apparatus 900 may be configured to perform one or more operations described herein in connection with FIG. 4, FIGS. 5A-5D, and/or FIG. 6. Additionally, or alternatively, the apparatus 900 may be configured to perform one or more processes described herein, such as process 700 of FIG. 7. In some aspects, the apparatus 900 and/or one or more components shown in FIG. 9 may include one or more components of the UE described in connection with FIG. 2. Additionally, or alternatively, one or more components shown in FIG. 9 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 900. In some aspects, the reception component 902 may include one or more antennas, a modem, a demodulator, a MIMO detector, a receive processor, a controller/processor, a memory, or a combination thereof, of the UE described in connection with FIG. 2.

The transmission component 904 may transmit communications, such as reference signals, control information, data communications, or a combination thereof, to the apparatus 906. In some aspects, one or more other components of the apparatus 900 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modem, a modulator, a transmit MIMO processor, a transmit processor, a controller/processor, a memory, or a combination thereof, of the UE described in connection with FIG. 2. In some aspects, the transmission component 904 may be co-located with the reception component 902 in a transceiver.

The reception component 902 may obtain, from a network node, signaling indicating one or more common timing offset parameters that are based at least in part on one or more delays between a satellite and a reference point in an NTN. The determination component 908 may determine a transmit time for an uplink signal based at least in part on the one or more common timing offset parameters and a starting time associated with an uplink slot in which the uplink signal is to arrive at the reference point. The transmission component 904 may output the uplink signal for transmission at the transmit time.

The reception component 902 may obtain, from the network node, signaling that indicates ephemeris information associated with the satellite, wherein the transmit time is further based at least in part on an epoch time for the ephemeris information.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

Figure 10:
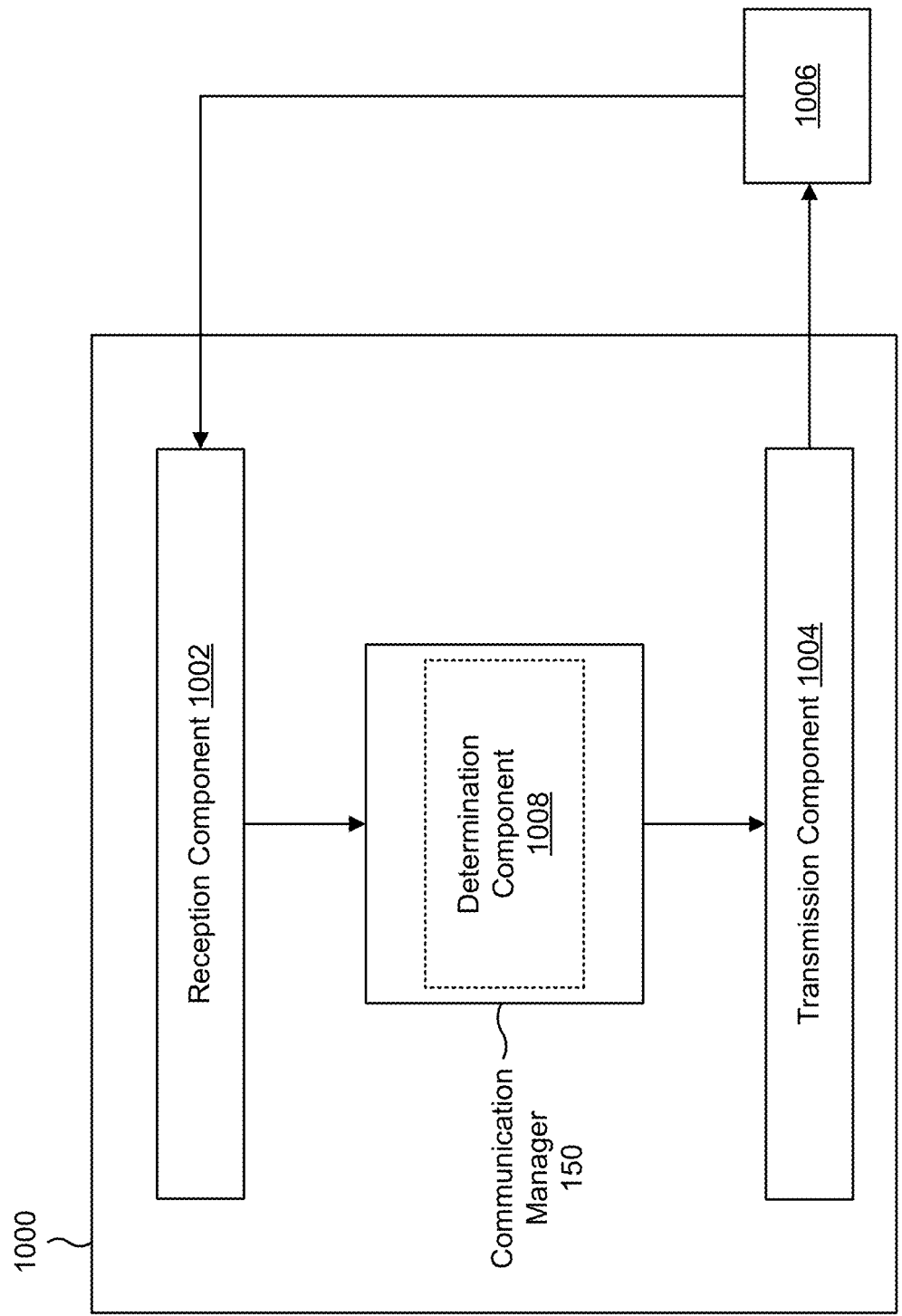

FIG. 10 is a diagram of an example apparatus 1000 for wireless communication. The apparatus 1000 may be a base station, or a base station may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1000 may include the communication manager 150. The communication manager 150 may include a determination component 1008, among other examples.

In some aspects, the apparatus 1000 may be configured to perform one or more operations described herein in connection with FIG. 4, FIGS. 5A-5C, and/or FIG. 6. Additionally, or alternatively, the apparatus 1000 may be configured to perform one or more processes described herein, such as process 800 of FIG. 8. In some aspects, the apparatus 1000 and/or one or more components shown in FIG. 10 may include one or more components of the base station described in connection with FIG. 2. Additionally, or alternatively, one or more components shown in FIG. 10 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1000. In some aspects, the reception component 1002 may include one or more antennas, a modem, a demodulator, a MIMO detector, a receive processor, a controller/processor, a memory, or a combination thereof, of the base station described in connection with FIG. 2.

The transmission component 1004 may transmit communications, such as reference signals, control information, data communications, or a combination thereof, to the apparatus 1006. In some aspects, one or more other components of the apparatus 1000 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modem, a modulator, a transmit MIMO processor, a transmit processor, a controller/processor, a memory, or a combination thereof, of the base station described in connection with FIG. 2. In some aspects, the transmission component 1004 may be co-located with the reception component 1002 in a transceiver.

The determination component 1008 may determine one or more delays between a satellite and a reference point in an NTN. The transmission component 1004 may output, for transmission to a UE, signaling indicating one or more common timing offset parameters that are based at least in part on the one or more delays between the satellite and the reference point.

The transmission component 1004 may output, for transmission to the UE, signaling that indicates ephemeris information associated with the satellite, wherein the one or more common timing offset parameters are further based at least in part on an epoch time for the ephemeris information.

The reception component 1002 may obtain, from the UE, an uplink signal that was transmitted at a UE-specific transmit time that is based at least in part on the one or more common timing offset parameters and a starting time associated with an uplink slot in which the uplink signal is to arrive at the reference point.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

The following provides an overview of some Aspects of the present disclosure:

Aspect 1: A method for wireless communication at a UE, comprising: obtaining, from a network node, signaling indicating one or more common timing offset parameters that are based at least in part on one or more delays between a satellite and a reference point in an NTN; determining a transmit time for an uplink signal based at least in part on the one or more common timing offset parameters and a starting time associated with an uplink slot in which the uplink signal is to arrive at the reference point; and outputting the uplink signal for transmission at the transmit time.

Aspect 2: The method of Aspect 1, wherein the reference point corresponds to a location in the NTN where downlink slots and uplink slots are synchronized and a slot duration is constant over time.

Aspect 3: The method of Aspect 2, wherein the reference point is at the network node.

Aspect 4: The method of Aspect 2, wherein the reference point is in a path between the satellite and the network node.

Aspect 5: The method of any of Aspects 1-4, further comprising: obtaining, from the network node, signaling that indicates ephemeris information associated with the satellite, wherein the transmit time is further based at least in part on an epoch time for the ephemeris information.

Aspect 6: The method of Aspect 5, wherein the epoch time for the ephemeris information is at a starting time for a downlink slot at the reference point.

Aspect 7: The method of any of Aspects 1-6, wherein the one or more common timing offset parameters include one or more of values for the one or more delays between the satellite and the reference point or one or more derivatives of the one or more delays between the satellite and the reference point.

Aspect 8: The method of any of Aspects 1-7, wherein the one or more common timing offset parameters include a one-way delay from the satellite to the reference point for a transmission to arrive at the reference point at a starting time of an uplink slot at the reference point.

Aspect 9: The method of any of Aspects 1-7, wherein the one or more common timing offset parameters include half of a round-trip delay between the reference point and the satellite for a transmission to arrive at the reference point at a starting time of an uplink slot at the reference point.

Aspect 10: The method of any of Aspects 1-9, wherein the one or more common timing offset parameters include a one-way delay from the reference point to the satellite for a transmission performed by the reference point at a starting time of a downlink slot at the reference point.

Aspect 11: The method of any of Aspects 1-10, wherein the one or more common timing offset parameters include a geometric distance between the reference point and the satellite at a starting time of an uplink slot at the reference point.

Aspect 12: The method of any of Aspects 1-11, wherein the one or more common timing offset parameters are indicated in a SIB, an RRC message, a MAC-CE, or DCI.

Aspect 13: The method of any of Aspects 1-12, wherein the transmit time is UE-specific.

Aspect 14: A method for wireless communication at a network node, comprising: determining one or more delays between a satellite and a reference point in an NTN; and outputting, for transmission to a UE, signaling indicating one or more common timing offset parameters that are based at least in part on the one or more delays between the satellite and the reference point.

Aspect 15: The method of Aspect 14, wherein the reference point corresponds to a location in the NTN where downlink slots and uplink slots are synchronized and a slot duration is constant over time.

Aspect 16: The method of Aspect 15, wherein the reference point is at the network node.

Aspect 17: The method of Aspect 15, wherein the reference point is in a path between the satellite and the network node.

Aspect 18: The method of any of Aspects 14-17, further comprising: outputting, for transmission to the UE, signaling that indicates ephemeris information associated with the satellite, wherein the one or more common timing offset parameters are further based at least in part on an epoch time for the ephemeris information.

Aspect 19: The method of Aspect 18, wherein the epoch time for the ephemeris information is at a starting time for a downlink slot at the reference point.

Aspect 20: The method of any of Aspects 14-19, wherein the one or more common timing offset parameters include one or more of values for the one or more delays between the satellite and the reference point or one or more derivatives of the one or more delays between the satellite and the reference point.

Aspect 21: The method of any of Aspects 14-20, wherein the one or more common timing offset parameters include a one-way delay from the satellite to the reference point for a transmission to arrive at the reference point at a starting time of an uplink slot at the reference point.

Aspect 22: The method of any of Aspects 14-21, wherein the one or more common timing offset parameters include half of a round-trip delay between the reference point and the satellite for a transmission to arrive at the reference point at a starting time of an uplink slot at the reference point.

Aspect 23: The method of any of Aspects 14-22, wherein the one or more common timing offset parameters include a one-way delay from the reference point to the satellite for a transmission performed by the reference point at a starting time of a downlink slot at the reference point.

Aspect 24: The method of any of Aspects 14-23, wherein the one or more common timing offset parameters include a geometric distance between the reference point and the satellite at a starting time of an uplink slot at the reference point.

Aspect 25: The method of any of Aspects 14-24, wherein the one or more common timing offset parameters are indicated in a SIB, an RRC message, a MAC-CE, or DCI.

Aspect 26: The method of any of Aspects 14-25, further comprising: obtaining, from the UE, an uplink signal that was transmitted at a UE-specific transmit time that is based at least in part on the one or more common timing offset parameters and a starting time associated with an uplink slot in which the uplink signal is to arrive at the reference point.

Aspect 27: An apparatus for wireless communication, comprising: a memory comprising instructions; and one or more processors configured to execute the instructions and cause the apparatus to perform the method of one or more of Aspects 1-13.

Aspect 28: A UE, comprising: a transceiver; a memory comprising instructions; and one or more processors configured to execute the instructions and cause the UE to perform the method of one or more of Aspects 1-13, wherein the transceiver is configured to receive the signaling indicating the one or more common timing offset parameters, transmit the uplink signal at the transmit time, or receive the signaling that indicates the ephemeris information associated with the satellite.

Aspect 29: An apparatus for wireless communication, comprising at least one means for performing the method of one or more of Aspects 1-13.

Aspect 30: A non-transitory computer-readable medium storing code for wireless communication, the code comprising instructions executable by an apparatus to perform the method of one or more of Aspects 1-13.

Aspect 31: An apparatus for wireless communication, comprising: a memory comprising instructions; and one or more processors configured to execute the instructions and cause the apparatus to perform the method of one or more of Aspects 14-26.

Aspect 32: A network node, comprising: a transceiver; a memory comprising instructions; and one or more processors configured to execute the instructions and cause the network node to perform the method of one or more of Aspects 14-26, wherein the transceiver is configured to transmit the signaling indicating the one or more common timing offset parameters, transmit the signaling that indicates the ephemeris information associated with the satellite, or receive the uplink signal that was transmitted at the transmit time.

Aspect 33: An apparatus for wireless communication, comprising at least one means for performing the method of one or more of Aspects 14-26.

Aspect 34: A non-transitory computer-readable medium storing code for wireless communication, the code comprising instructions executable by an apparatus to perform the method of one or more of Aspects 14-26.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication, comprising:
   one or more memories comprising instructions; and
   one or more processors configured to execute the instructions and cause the apparatus to:
      obtain, from a network node, signaling that indicates ephemeris information associated with a satellite;
      obtain, from the network node, a system information block indicating one or more common timing offset parameters that are based at least in part on one or more delays between the satellite and a reference point in a non-terrestrial network (NTN),
         wherein the reference point corresponds to a location in the NTN where a downlink and an uplink are frame aligned in time with an offset, and
         wherein a transmit time is based at least in part on (i) the one or more common timing offset parameters, (ii) a starting time associated with an uplink slot in which an uplink signal is to arrive at the reference point, and (iii) an epoch time, associated with the ephemeris information, that is a starting time associated with a downlink slot, wherein the downlink slot is at the reference point; and
      output the uplink signal for transmission at the transmit time.

2. The apparatus of claim 1, wherein the reference point is at the network node.

3. The apparatus of claim 1, wherein the reference point is in a path between the satellite and the network node.

4. The apparatus of claim 1, wherein the one or more common timing offset parameters include at least one of:
   one or more values associated with the one or more delays between the satellite and the reference point, or
   one or more derivatives associated with the one or more delays between the satellite and the reference point.

5. The apparatus of claim 1, wherein the one or more common timing offset parameters include a one-way delay from the satellite to the reference point for a transmission to arrive at the reference point at the starting time associated with the uplink slot.

6. The apparatus of claim 1, wherein the one or more common timing offset parameters include half of a round-trip delay between the reference point and the satellite for a transmission to arrive at the reference point at the starting time associated with the uplink slot.

7. The apparatus of claim 1, wherein the one or more common timing offset parameters include a one-way delay from the reference point to the satellite for a transmission performed by the reference point at the starting time associated with the downlink slot.

8. The apparatus of claim 1, wherein the one or more common timing offset parameters include a value associated with a distance between x and y and a speed of light.

9. The apparatus of claim 1, wherein the transmit time is UE-specific.

10. The apparatus of claim 1, wherein a slot duration is constant over time at the location in the NTN.

11. An apparatus for wireless communication, comprising:
one or more memories comprising instructions; and
one or more processors configured to execute the instructions and cause the apparatus to:
output, for transmission to a user equipment (UE), signaling that indicates ephemeris information associated with a satellite,
wherein one or more delays is between the satellite and a reference point in a non-terrestrial network (NTN) and is based at least in part on the ephemeris information,
wherein the reference point corresponds to a location in the NTN where a downlink and an uplink are frame aligned in time with an offset; and
output, for transmission to the UE, a system information block indicating one or more common timing offset parameters that are based at least in part on the one or more delays between the satellite and the reference point,
wherein the one or more common timing offset parameters are further based at least in part on an epoch time, associated with the ephemeris information, that is a starting time associated with a downlink slot, wherein the downlink slot is at the reference point.

12. The apparatus of claim 11, wherein the reference point is at the apparatus.

13. The apparatus of claim 11, wherein the reference point is in a path between the satellite and the apparatus.

14. The apparatus of claim 11, wherein the one or more common timing offset parameters include at least one of:
one or more values associated with the one or more delays between the satellite and the reference point, or
one or more derivatives associated with the one or more delays between the satellite and the reference point.

15. The apparatus of claim 11, wherein the one or more common timing offset parameters include a one-way delay from the satellite to the reference point for a transmission to arrive at the reference point at a starting time associated with an uplink slot at the reference point.

16. The apparatus of claim 11, wherein the one or more common timing offset parameters include half of a round-trip delay between the reference point and the satellite for a transmission to arrive at the reference point at a starting time associated with an uplink slot at the reference point.

17. The apparatus of claim 11, wherein the one or more common timing offset parameters include a one-way delay from the reference point to the satellite for a transmission performed by the reference point at the starting time associated with the downlink slot.

18. The apparatus of claim 11, wherein the one or more common timing offset parameters include a value associated with a distance between x and y and a speed of light.

19. The apparatus of claim 11, wherein the one or more processors are further configured to cause the apparatus to:
obtain, from the UE, an uplink signal that was transmitted at a UE-specific transmit time that is based at least in part on the one or more common timing offset parameters and a starting time associated with an uplink slot in which the uplink signal is to arrive at the reference point.

20. The apparatus of claim 11, further comprising a transceiver configured to transmit, to the UE, the signaling indicating the one or more common timing offset parameters, wherein the apparatus is configured as a network node.

21. The apparatus of claim 11, wherein a slot duration is constant over time at the location in the NTN.

22. A user equipment (UE), comprising:
at least one transceiver;
one or more memories comprising instructions; and
one or more processors configured to execute the instructions and cause the UE to:
receive, via the at least one transceiver from a network node, signaling that indicates ephemeris information associated with a satellite;
receive, via the at least one transceiver from the network node, a system information block indicating one or more common timing offset parameters that are based at least in part on one or more delays between the satellite and a reference point in a non-terrestrial network (NTN),
wherein the reference point corresponds to a location in the NTN where a downlink and an uplink are frame aligned in time with an offset, and
wherein a transmit time is based at least in part on (i) the one or more common timing offset parameters, (ii) starting time associated with an uplink slot in which an uplink signal is to arrive at the reference point, and (iii) an epoch time, associated with the ephemeris information, that is a starting time associated with a downlink slot, wherein the downlink slot is at the reference point; and
transmit, via the at least one transceiver, the uplink signal at the transmit time.

23. The UE of claim 22, wherein the one or more common timing offset parameters include a value associated with a distance between x and y and speed of light.

24. The UE of claim 22, wherein the reference point is at the network node.

25. The UE of claim 22, wherein the reference point is in a path between the satellite and the network node.

26. The UE of claim 22, wherein the one or more common timing offset parameters include at least one of:
one or more values associated with the one or more delays between the satellite and the reference point, or
one or more derivatives associated with the one or more delays between the satellite and the reference point.

27. The UE of claim 22, wherein a slot duration is constant over time at the location in the NTN.

28. The UE of claim 22, wherein the one or more common timing offset parameters include a one-way delay from the satellite to the reference point for a transmission to arrive at the reference point at the starting time associated with the uplink slot.

29. The UE of claim 22, wherein the one or more common timing offset parameters include half of a round-trip delay between the reference point and the satellite for a transmission to arrive at the reference point at the starting time associated with the uplink slot.

* * * * *